(12) United States Patent
Lee et al.

(10) Patent No.: US 10,530,443 B2
(45) Date of Patent: Jan. 7, 2020

(54) ELECTRONIC DEVICE AND METHOD FOR COMPENSATING FOR SIGNAL PHASE

(71) Applicant: Samsung Electronics Co., Ltd., Suwon-si, Gyeonggi-do (KR)

(72) Inventors: Han-Yeop Lee, Suwon-si (KR); Dong-Il Yang, Suwon-si (KR); Bong-Sup Son, Daegu (KR); Dong-Ju Lee, Daegu (KR); Won-Jin Choi, Gumi-si (KR); Hyo-Seok Na, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/995,818

(22) Filed: Jun. 1, 2018

(65) Prior Publication Data

US 2018/0359010 A1 Dec. 13, 2018

(30) Foreign Application Priority Data

Jun. 7, 2017 (KR) .................. 10-2017-0071006

(51) Int. Cl.
*H04B 7/06* (2006.01)
*H04B 7/0408* (2017.01)
(Continued)

(52) U.S. Cl.
CPC ............ *H04B 7/0615* (2013.01); *H04B 1/02* (2013.01); *H04B 7/0408* (2013.01); *H04B 7/06* (2013.01);
(Continued)

(58) Field of Classification Search
CPC .... H04B 7/0615; H04B 7/0408; H04B 17/14; H04B 1/02; H04B 7/06; H04B 2001/0408
(Continued)

(56) References Cited

U.S. PATENT DOCUMENTS

2002/0009156 A1* 1/2002 Hottinen ............... H04B 7/061
375/267
2011/0195670 A1* 8/2011 Dakshinamurthy ........................
H01Q 3/2647
455/73

(Continued)

FOREIGN PATENT DOCUMENTS

KR 10-0645526 B1 11/2006
WO 2013/028886 A1 2/2013

OTHER PUBLICATIONS

European Search Report dated Oct. 16, 2018, issued in European Patent Application No. 18176482.0.

*Primary Examiner* — Michael Y Mapa
(74) *Attorney, Agent, or Firm* — Jefferson IP Law, LLP

(57) ABSTRACT

An electronic device is provided. The electronic device includes a first antenna configured to transmit a first transmission signal having a first phase, a second antenna configured to transmit a second transmission signal having a second phase, a transceiver electrically connected to the first antenna and the second antenna, and a processor. The transceiver is configured to identify a first feedback transmission signal including part of the first transmission signal and a second feedback transmission signal including part of the second transmission signal and calculate a correlation for the first and second feedback transmission signals. The processor is configured to predict radiation power radiated from the electronic device based on at least the part of the correlation, control the transceiver to adjust at least one of the first phase or the second phase, and change the predicted radiation power to a predetermined value based on an operation for the adjustment.

16 Claims, 18 Drawing Sheets

(51) Int. Cl.
*H04B 17/14* (2015.01)
*H04B 1/02* (2006.01)
*H04B 1/04* (2006.01)

(52) U.S. Cl.
CPC ..... *H04B 17/14* (2015.01); *H04B 2001/0408* (2013.01)

(58) Field of Classification Search
USPC .......... 455/13.4, 127.1, 522, 562.1; 370/252, 370/334
See application file for complete search history.

(56) References Cited

U.S. PATENT DOCUMENTS

| | | | |
|---|---|---|---|
| 2016/0087483 A1* | 3/2016 | Hietala | H02J 50/10 320/108 |
| 2016/0149632 A1 | 5/2016 | Ohara et al. | |
| 2016/0191177 A1 | 6/2016 | Kim et al. | |
| 2016/0294401 A1 | 10/2016 | Jin et al. | |
| 2017/0099091 A1* | 4/2017 | Martin | H04B 7/0615 |
| 2018/0053997 A1* | 2/2018 | Noto | H03F 1/32 |

* cited by examiner

| PHASE SHIFT | -180° | -135° | -90° | -45° | 0° | 45° | 90° | 135° | 180° |
|---|---|---|---|---|---|---|---|---|---|
| f*g | 1 | 1.5 | 2 | 1.5 | 1 | 0.8 | 0 | 0.8 | 1 |

$P_{max}$ ↓ (at -90°)   $P_{min}$ ↓ (at 90°)

| PHASE SHIFT | -180° | -135° | -90° | -45° | 0° | 45° | 90° | 135° | 180° |
|---|---|---|---|---|---|---|---|---|---|
| f*g | 1 | 1.5 | 2 | 1.5 | 1 | 0.8 | 0 | 0.8 | 1 |
| RADIATION POWER | $P_1$ | $P_2$ | $P_3$ | $P_4$ | $P_5$ | $P_6$ | $P_7$ | $P_8$ | $P_9$ |

ELECTRONIC DEVICE AND METHOD FOR COMPENSATING FOR SIGNAL PHASE

CROSS-REFERENCE TO RELATED APPLICATION(S)

This application is based on and claims priority under 35 U.S.C. § 119(a) of a Korean patent application number 10-2017-0071006, filed on Jun. 7, 2017, in the Korean Intellectual Property Office, the disclosure of which is incorporated by reference herein in its entirety.

BACKGROUND

1. Field

The disclosure relates to an electronic device and a method for compensating for a signal phase.

2. Description of Related Art

With the development of multiple-input multiple-output (MIMO) antenna communication technology, a user equipment (UE) such as a mobile device can use two or more antennas. In order to improve transmission performance, that is, in order to resolve a reduction in total radiated power (TRP), call drop, and transmission mute of a UE due to a lack of power, a beamforming Tx diversity (BFTD) technology using a plurality of antennas has come to be used in a mobile communication system.

In the BFTD technology, two transmission signals may be required to have the same phase. A UE for performing BFTD may include a single signal generation module in a communication module, and the single signal generation module may generate two transmission signals having the same phase. The two transmission signals having the same phase are suitable for BFTD. The signal generation module includes an oscillator and a phase-locked loop (PLL).

Meanwhile, in an uplink carrier aggregation (CA) technology, two transmission signals may be required to have different frequencies. Accordingly, a UE for performing CA may include two signal generation modules in a communication module, and each of the two signal generation modules may generate transmission signals having different frequencies. Accordingly, the UE for performing CA may generate one transmission signal through each of the two signal generation modules. The transmission signals may have different frequencies.

Recently, it has become necessary for the UE to support BFTD as well as CA. Therefore, the UE having two signal generation modules to perform CA must additionally satisfy the performance of BFTD.

The above information is presented as background information only to assist with an understanding of the disclosure. No determination has been made, and no assertion is made, as to whether any of the above might be applicable as prior art with regard to the disclosure.

SUMMARY

Meanwhile, a user equipment (UE) having two signal generation modules suitable for carrier aggregation (CA) may face the following problem in order to also implement beamforming Tx diversity (BFTD).

In BFTD implementation, it is preferable for the frequencies of two transmission signals to be the same as each other and for the phases of the two transmission signals to also be the same as each other. However, even though the UE including two signal generation modules for CA implementation generates two transmission signals having the same frequency and the same phase, a difference between signal transfer paths within the interval circuit may exist. The difference between the signal transfer paths may change the phases of the two transmission signals. That is, there may be a phase difference between the two transmission signals. The phase difference may cause the final power of transmission signals radiated to the air through a plurality of antennas to be insufficient for the design.

Aspects of the disclosure are to address at least the above-mentioned problems and/or disadvantages and to provide at least the advantages described below. Accordingly, an aspect of the disclosure is to provide a signal compensation method for reducing the phase difference.

In addition to the method of compensating for signals, it is required to originally generate two transmission signals to reduce the possibility of the generation of a phase difference. The low possibility of the generation of the phase difference may improve the performance of the UE for BFTD implementation. Accordingly, a method of reducing the possibility of the generation of the phase difference is needed.

Another aspect of the disclosure is to provide an electronic device for compensating for the phase difference between two transmission signals when BFTD is implemented in the electronic device including two signal generation modules.

Another aspect of the disclosure is to provide an electronic device for generating transmission signals to reduce the phase difference between the two transmission signals when BFTD is implemented in the electronic device including two signal generation modules.

Additional aspects will be set forth in part in the description which follows and, in part, will be apparent from the description, or may be learned by practice of the presented embodiments.

In accordance with an aspect of the disclosure, an electronic device is provided. The electronic device includes a first antenna configured to transmit a first transmission signal having a first phase, a second antenna configured to transmit a second transmission signal having a second phase, a transceiver electrically connected to the first antenna and the second antenna, and a processor, wherein the transceiver is configured to identify a first feedback transmission signal including a part of the first transmission signal and a second feedback transmission signal including a part of the second transmission signal and to calculate a correlation for the first feedback transmission signal and the second feedback transmission signal, and wherein the processor is configured to predict radiation power radiated from the electronic device based on at least the part of the correlation, control the transceiver to adjust at least one of the first phase or the second phase, and change the predicted radiation power to a predetermined value based on an operation for the adjustment.

In accordance with another aspect of the disclosure, a method of compensating for a signal phase by an electronic device is provided. The method includes identifying a first feedback transmission signal including a part of a first transmission signal having a first phase, which is transmitted through a first antenna, identifying a second feedback transmission signal including a part of a second transmission signal having a second phase, which is transmitted through a second antenna, calculating a first correlation for the first feedback transmission signal and the second feedback transmission signal, predicting radiation power radiated from the electronic device based on the first correlation, adjusting at least one of the first phase or the second phase, and changing the predicted radiation power to a predetermined value based on the adjusting of the at least one phase.

In accordance with another aspect of the disclosure, an electronic device is provided. The electronic device includes a transceiver, an antenna circuit including a first antenna and a second antenna, a first phase shifter configured to control a phase of a predetermined signal relevant to the first antenna, a second phase shifter configured to control a phase of a predetermined signal relevant to the second antenna, and a processor, wherein the processor is configured to identify a first correlation between a first signal controlled through the first phase shifter and a second signal controlled through the second phase shifter, and a second correlation, calculated based on the changed phase of at least one of the first signal and the second signal using the transceiver, determine one of a phase value corresponding to the first correlation and a phase value corresponding to the second correlation based on at least the first correlation and the second correlation, output the first signal controlled through the first phase shifter using the transceiver and the first antenna, and output the second signal in a state in which the phase of the second signal is compensated to have the one phase value through the second phase shifter using the transceiver and the second antenna.

According to various embodiments, it is possible to provide an electronic device and a method for improving beamforming (BF) gain, total radiated power (TRP), call drop, and transmission mute by compensating for the phase difference between two transmission signals by an electronic device including two signal generation modules.

According to various embodiments, it is possible to provide an electronic device and a method for improving BF gain, TRP, call drop, and transmission mute by generating two transmission signals having a small phase difference therebetween by an electronic device including two signal generation modules.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 7D is a conceptual diagram illustrating radiation power prediction through the correlation according to an embodiment of the disclosure;

FIG. 7E is a conceptual diagram illustrating the radiation power prediction through the correlation according to an embodiment of the disclosure;

Throughout the drawings, like reference numerals will be understood to refer to like parts, components, and structures.

DETAILED DESCRIPTION

Figure 1:
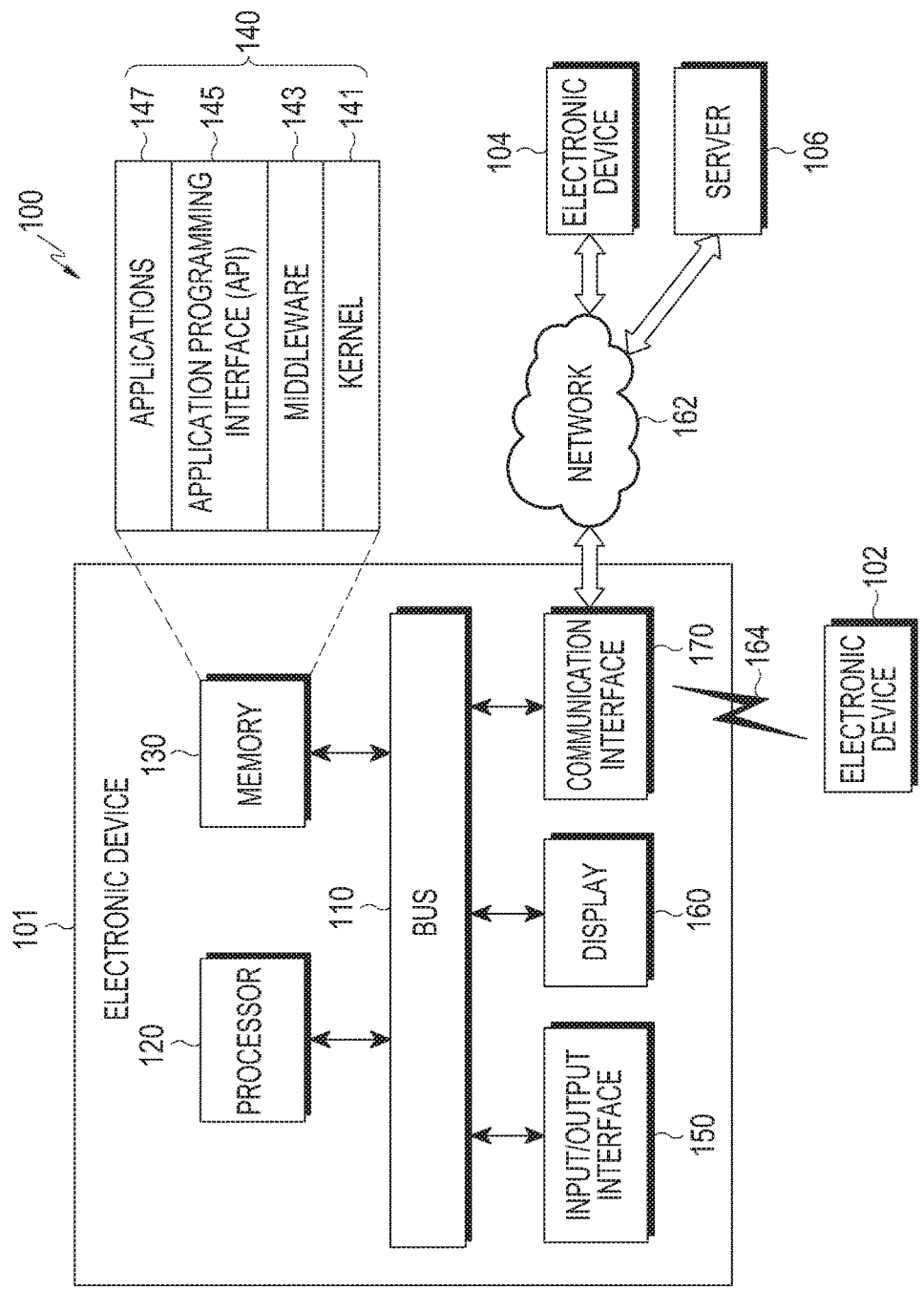
FIG. 1 is a block diagram illustrating an electronic device and a network according to various embodiments of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly indicates otherwise. Thus, for example, reference to "a component surface" includes reference to one or more of such surfaces.

The expression "a first", "a second", "the first", or "the second" used in various embodiments may modify various components regardless of the order and/or the importance but does not limit the corresponding components. When an element (e.g., first element) is referred to as being "(functionally or communicatively) connected," or "directly coupled" to another element (second element), the element may be connected directly to the other element or connected to the other element through yet another element (e.g., third element).

The expression "configured to" as used in various embodiments may be interchangeably used with, for example, "suitable for", "having the capacity to", "designed to", "adapted to", "made to", or "capable of" in terms of hardware or software, according to circumstances. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

An electronic device according to various embodiments may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit). In some embodiments, the electronic device may include at least one of, for example, a television (TV), a digital video disc (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

In other embodiments, the electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.). According to some embodiments, an electronic device may include at least one of a part of furniture or a building/structure, an electronic board, an electronic signature receiving device, a projector, and various types of measuring instruments (e.g., a water meter, an electric meter, a gas meter, a radio wave meter, and the like). In various embodiments, the electronic device may be flexible, or may be a combination of one or more of the aforementioned various devices. The electronic device according to one embodiment is not limited to the above described devices. In the disclosure, the term "user" may indicate a person using an electronic device or a device (e.g., an artificial intelligence electronic device) using an electronic device.

FIG. 1 is a block diagram of an electronic device and a network according to various embodiments of the disclosure.

Referring to FIG. 1, an electronic device 101 within a network environment 100 according to various embodiments will be described. The electronic device 101 may include a bus 110, a processor 120, a memory 130, an input/output interface 150, a display 160, and a communication interface 170. In some embodiments, the electronic device 101 may omit at least one of the elements, or may further include other elements. The bus 110 may include, for example, a circuit that interconnects the elements 110 to 170 and transmits communication (for example, control messages or data) between the elements. The processor 120 may include one or more of a central processing unit, an application processor (AP), and a communication processor (CP). The processor 120, for example, may carry out operations or data processing relating to the control and/or communication of at least one other element of the electronic device 101.

The memory 130 may include volatile and/or nonvolatile memory. The memory 130 may store, for example, instructions or data relevant to at least one other element of the electronic device 101. According to an embodiment, the memory 130 may store software and/or a program 140. The program 140 may include, for example, a kernel 141, middleware 143, an application programming interface (API) 145, and/or applications (or "apps") 147. At least some of the kernel 141, the middleware 143, and the API 145 may be referred to as an operating system. The kernel 141 may control or manage system resources (for example, the bus 110, the processor 120, or the memory 130) used for executing an operation or function implemented by other programs (for example, the middleware 143, the API 145, or the application 147). Furthermore, the kernel 141 may provide an interface through which the middleware 143, the API 145, or the applications 147 may access the individual elements of the electronic device 101 to control or manage system resources.

The middleware 143 may function as, for example, an intermediary for allowing the API 145 or the applications 147 to communicate with the kernel 141 to exchange data. Furthermore, the middleware 143 may process one or more task requests, which are received from the applications 147, according to priorities thereof. For example, the middleware 143 may assign priorities for using system resources (for example, the bus 110, the processor 120, the memory 130, or the like) of the electronic device 101 to one or more of the applications 147, and may process the one or more task requests. The API 145 is an interface through which the applications 147 control functions provided from the kernel 141 or the middleware 143, and may include, for example, at least one interface or function (for example, instruction) for file control, window control, image processing, or text control. For example, the input/output interface 150 may forward instructions or data, input from a user or an external device, to the other element(s) of the electronic device 101, or may output instructions or data, received from the other element(s) of the electronic device 101, to the user or the external device.

The display 160 may include, for example, a liquid crystal display (LCD), a light-emitting diode (LED) display, an organic light-emitting diode (OLED) display, a micro electro mechanical system (MEMS) display, or an electronic paper display. The display 160 may display, for example, various types of contents (for example, text, images, videos, icons, symbols, and the like) for a user. The display 160 may include a touch screen and may receive, for example, a touch, gesture, proximity, or hovering input using an electronic pen or the user's body part. The communication interface 170 may set, for example, communication between the electronic device 101 and an external device (for example, a first external electronic device 102, a second external electronic device 104, or a server 106). For example, the communication interface 170 may be connected to a network 162 through wireless or wired communication to communicate with the external device (for example, the second external electronic device 104 or the server 106).

The wireless communication may include, for example, cellular communication that uses at least one of long term evolution (LTE), LTE-advanced (LTE-A), code division multiple access (CDMA), wideband CDMA (WCDMA), universal mobile telecommunications system (UMTS), wireless broadband (WiBro), global system for mobile communications (GSM), or the like. According to an embodiment, like the short-range communication 164 illustrated in FIG. 1, the wireless communication may include, for example, at least one of Wi-Fi, light fidelity (Li-Fi), Bluetooth, Bluetooth low energy (BLE), ZigBee, near field communication (NFC), magnetic secure transmission, radio frequency (RF), and body area network (BAN). According to an embodiment, the wireless communication may include a global navigation satellite system (GNSS). The GNSS may be, for example, a GPS, a global navigation satellite system (GLONASS), a BeiDou navigation satellite system (hereinafter, referred to as "BeiDou"), or Galileo (the European global satellite-based navigation system). Hereinafter, in this document, the term "GPS" may be interchangeable with the term "GNSS". The wired communication may include, for example, at least one of a universal serial bus (USB), a high-definition multimedia interface (HDMI), recommended standard 232 (RS-232), and a plain old telephone service (POTS). The network 162 may include a telecommunications network, for example, at least one of a computer network (for example, a local area network (LAN) or a wide area network (WAN)), the Internet, and a telephone network.

Each of the first and second external electronic devices 102 and 104 may be of the same or a different type from the electronic device 101. According to various embodiments, all or some of the operations executed in the electronic device 101 may be executed in another electronic device or a plurality of electronic devices (for example, the electronic devices 102 and 104 or the server 106). According to an embodiment, when the electronic device 101 has to perform some functions or services automatically or in response to a request, the electronic device 101 may make a request for performing at least some functions relating thereto to another device (for example, the electronic device 102 or 104 or the server 106) instead of performing the functions or services by itself or in addition. Another electronic device (for example, the electronic device 102 or 104, or the server 106) may execute the requested functions or additional functions, and may deliver the result of execution thereof to the electronic device 101. The electronic device 101 may provide the received result as it is, or may additionally process the received result in order to provide the requested functions or services. To this end, for example, cloud-computing, distributed-computing, or client-server-computing technology may be used.

Figure 2:
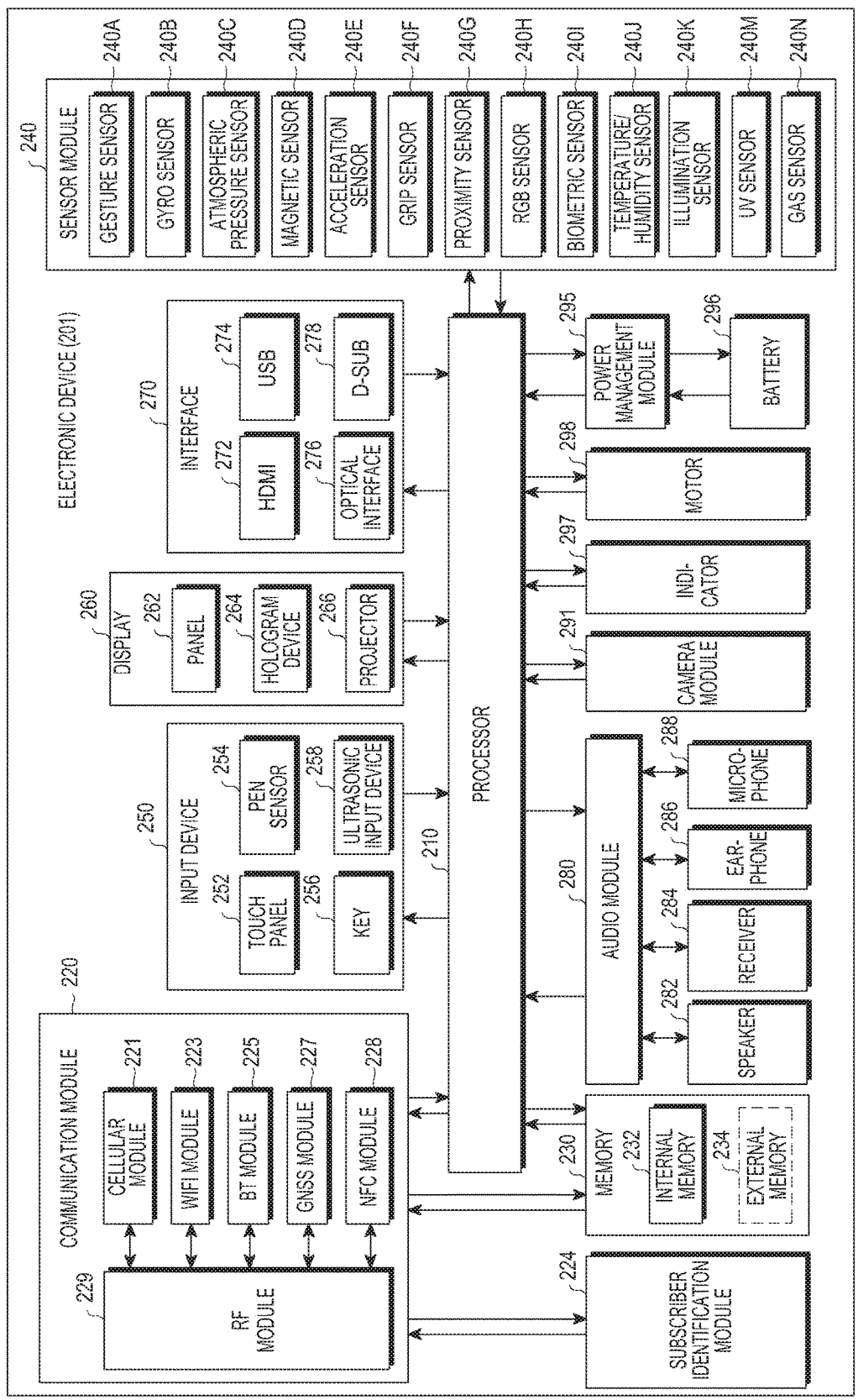
FIG. 2 is a block diagram of the electronic device according to various embodiments of the disclosure.

FIG. 2 is a block diagram of an electronic device 201 according to various embodiments of the disclosure.

The electronic device 201 may include, for example, all or part of the electronic device 101 illustrated in FIG. 1. The electronic device 201 may include at least one processor 210 (for example, an AP), a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298. The processor 210 may control, for example, a plurality of hardware or software elements connected thereto and may perform various data processing and operations by driving an operating system or an application. The processor 210 may be implemented by, for example, a system on chip (SoC). According to an embodiment, the processor 210 may further include a graphics processing unit (GPU) and/or an image signal processor (ISP). The processor 210 may also include at least some of the elements illustrated in FIG. 2 (for example, a cellular module 221). The processor 210 may load, in volatile memory, instructions or data received from at least one of the other elements (for example, nonvolatile memory), process the loaded instructions or data, and store the resultant data in the nonvolatile memory.

The communication module 220 may have a configuration that is the same as, or similar to, that of the communication interface 170. The communication module 220 may include, for example, a cellular module 221, a Wi-Fi module 223, a Bluetooth module 225, a GNSS module 227, an NFC module 228, and an RF module 229. The cellular module 221 may provide, for example, a voice call, a video call, a text message service, an Internet service, or the like through a communication network. According to an embodiment, the cellular module 221 may identify and authenticate the electronic device 201 within a communication network using the SIM 224 (for example, a SIM card). According to an embodiment, the cellular module 221 may perform at least some of the functions that the processor 210 may provide. According to an embodiment, the cellular module 221 may include a CP. According to some embodiments, at least some (for example, two or more) of the cellular module 221, the Wi-Fi module 223, the BT module 225, the GNSS module 227, and the NFC module 228 may be included in one integrated chip (IC) or IC package. The RF module 229 may transmit/receive, for example, a communication signal (for example, an RF signal). The RF module 229 may include, for example, a transceiver, a power amp module (PAM), a frequency filter, a low-noise amplifier (LNA), an antenna, or the like. According to another embodiment, at least one of the cellular module 221, the Wi-Fi module 223, the BT module 225, the GNSS module 227, and the NFC module 228 may transmit/receive an RF signal through a separate RF module. The SIM 224 may include, for example, a card that includes a subscriber identity module and/or an embedded SIM, and may contain unique identification information (for example, an integrated circuit card identifier (ICCID)) or subscriber information (for example, an international mobile subscriber identity (IMSI)).

The memory 230 (for example, the memory 130) may include, for example, an internal memory 232 or an external memory 234. The internal memory 232 may include, for example, at least one of a volatile memory (for example, a dynamic random access memory (DRAM), a static RAM (SRAM), a synchronous dynamic RAM (SDRAM), or the like) and a nonvolatile memory (for example, a one-time programmable read-only memory (OTPROM), a programmable ROM (PROM), an erasable programmable ROM (EPROM), an electrically erasable programmable ROM (EEPROM), a mask ROM, a flash ROM, a flash memory, a hard disk drive, or a solid-state drive (SSD)). The external memory 234 may include a flash drive, for example, a compact flash (CF), a secure digital (SD), a micro-SD, a mini-SD, an eXtreme digital (xD), a multimedia card (MMC), a memory stick, and the like. The external memory 234 may be functionally and/or physically connected to the electronic device 201 through any of various interfaces.

The sensor module 240 may, for example, measure a physical quantity or detect the operating state of the electronic device 201, and may convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (for example, a red, green, blue (RGB) sensor), a biometric sensor 240I, a temperature/humidity sensor 240J, an illumination sensor 240K, an ultraviolet (UV) sensor 240M, and a gas sensor 240N. Additionally or alternatively, the sensor module 240 may include, for example, an e-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein. In some embodiments, the electronic device 201 may further include a processor, which is configured to control the sensor module 240, as a part of the processor 210 or separately from the processor 210 in order to control the sensor module 240 while the processor 210 is in a sleep state. The gas sensor 240N may sense gas in the air. The gas sensor 240N may include at least one of a semiconductor sensor, a ceramic temperature and humidity sensor, a piezoelectric sensor, a catalytic combustion sensor, a solid electrolyte sensor, an electrochemical sensor, and an infrared absorption sensor, and a more detailed description will be made below.

The input device 250 may include, for example, a touch panel 252, a (digital) pen sensor 254, a key 256, or an ultrasonic input device 258. The touch panel 252 may use, for example, at least one of a capacitive type, a resistive type, an infrared type, and an ultrasonic type. Furthermore, the touch panel 252 may further include a control circuit. The touch panel 252 may further include a tactile layer to provide a tactile reaction to a user. The (digital) pen sensor 254 may include, for example, a recognition sheet that is a part of, or separate from, the touch panel. The key 256 may include, for example, a physical button, an optical key, or a keypad. The ultrasonic input device 258 may detect ultrasonic waves, which are generated by an input tool, through a microphone (for example, a microphone 288) to identify data corresponding to the detected ultrasonic waves.

The display 260 (for example, the display 160) may include a panel 262, a hologram device 264, a projector 266, and/or a control circuit for controlling the same. The panel 262 may be implemented to be, for example, flexible, transparent, or wearable. The panel 262, together with the touch panel 252, may be configured as one or more modules. According to an embodiment, the panel 262 may include a pressure sensor (or a POS sensor) which may measure the strength of pressure of a user's touch. The pressure sensor may be implemented so as to be integrated with the touch panel 252, or may be implemented as one or more sensors separate from the touch panel 252. The hologram device 264 may show a three-dimensional image in the air using light interference. The projector 266 may display an image by projecting light onto a screen. The screen may be located, for example, in the interior of, or on the exterior of, the electronic device 201. The interface 270 may include, for example, an HDMI 272, a USB 274, an optical interface 276, or a D-subminiature (D-sub) interface 278. The interface 270 may be included in, for example, the communication interface 170 illustrated in FIG. 1. Additionally or alternatively, the interface 270 may, for example, include a mobile high-definition link (MHL) interface, a SD card/MMC interface, or an infrared data association (IrDA) standard interface.

The audio module 280 may convert, for example, sound into an electrical signal, and vice versa. At least some elements of the audio module 280 may be included, for example, in the input/output interface 145 illustrated in FIG. 1. The audio module 280 may process sound information that is input or output through, for example, a speaker 282, a receiver 284, earphones 286, the microphone 288, and the like. The camera module 291 is a device that can photograph a still image and a moving image. According to an embodiment, the camera module 291 may include one or more image sensors (for example, a front sensor or a rear sensor), a lens, an ISP, or a flash (for example, an LED or xenon lamp). The power management module 295 may manage, for example, the power of the electronic device 201. According to an embodiment, the power management module 295 may include a power management integrated circuit (PMIC), a charger IC, or a battery or fuel gauge. The PMIC may use a wired and/or wireless charging method. Examples of the wireless charging method may include a magnetic resonance method, a magnetic induction method, an electromagnetic wave method, and the like. Additional circuits (for example, a coil loop, a resonance circuit, a rectifier, and the like) for wireless charging may be further included. The battery gauge may measure, for example, the remaining charge of the battery 296 and a voltage, current, or temperature while charging. The battery 296 may include, for example, a rechargeable battery and/or a solar battery.

The indicator 297 may display a particular state, for example, a booting state, a message state, a charging state, or the like of the electronic device 201 or a part (for example, the processor 210) of the electronic device 201. The motor 298 may convert an electrical signal into a mechanical vibration and may generate a vibration, a haptic effect, or the like. The electronic device 201 may include a mobile TV support device that can process media data according to a standard such as digital multimedia broadcasting (DMB), digital video broadcasting (DVB), mediaFlo™, and the like. Each of the above-described component elements of hardware according to the disclosure may be configured with one or more components, and the names of the corresponding component elements may vary based on the type of electronic device. According to various embodiments, the electronic device (for example, the electronic device 201) may not include some elements, or may further include additional elements. Some of the elements may be coupled to constitute one object, but the electronic device may perform the same functions as those of the corresponding elements before being coupled to each other.

The term "module" as used herein may include a unit consisting of hardware, software, or firmware, and may, for example, be used interchangeably with the term "logic", "logical block", "component", "circuit", or the like. The "module" may be an integrated component or a minimum unit for performing one or more functions or a part thereof. The "module" may be mechanically or electronically implemented, and may include, for example, an application-specific integrated circuit (ASIC) chip, a field-programmable gate array (FPGA), or a programmable logic device, which is currently known or is to be developed in the future, for performing certain operations. At least some of devices (for example, modules or functions thereof) or methods (for example, operations) according to various embodiments may be implemented by an instruction which is stored in a computer-readable storage medium (for example, the memory 130) in the form of a program module. The instruction, when executed by a processor (for example, the processor 120), may cause the processor to execute the function corresponding to the instruction. The computer-readable storage medium may include a hard disk, a floppy disk, magnetic media (for example, a magnetic tape), optical media (for example, compact disc (CD)-ROM and DVD), magneto-optical media (for example, a floptical disk), an internal memory, and the like. The instruction may include code made by a complier or code that can be executed by an interpreter. The programming module according to the disclosure may include one or more of the aforementioned components or may further include other additional components, or some of the aforementioned components may be omitted. Operations performed by a module, a programming module, or other elements according to various embodiments may be executed sequentially, in parallel, repeatedly, or in a heuristic manner. At least some operations may be executed according to another sequence, may be omitted, or may further include other operations.

Figure 3:
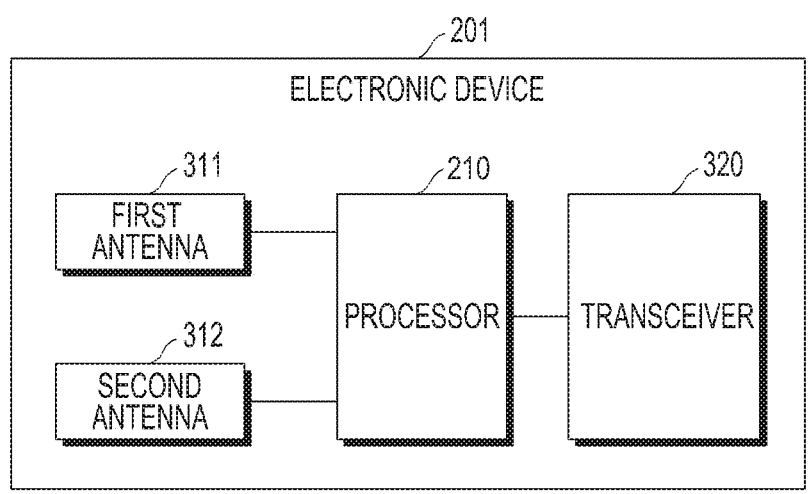
FIG. 3 is a block diagram illustrating the electronic device according to an embodiment of the disclosure.

FIG. 3 is a block diagram illustrating the electronic device according to an embodiment of the disclosure.

Referring to FIG. 3, the configuration of the electronic device 201 is schematically illustrated. The electronic device 201 may include a first antenna 311, a second antenna 312, a transceiver 320, and the processor 210, and the first antenna 311, the second antenna 312, and the transceiver 320 may be included in the communication module 220 or the RF module 229 of FIG. 2.

The first antenna 311 and the second antenna 312 may radiate electromagnetic waves to the air and transmit signals from the electronic device 201 to the air through the radiated electromagnetic waves. The first antenna 311 and the second antenna 312 may allow the electronic device 201 to receive signals through electromagnetic waves radiated from another electronic device (for example, the electronic device 102 or 104, or a base station (BS)) to the air. The first antenna 311 and the second antenna 312 may handle transmission signals as the part of a transmitting side and reception signals as the part of a receiving side.

The transmission signals may include a signal emitted from the electronic device 201 to the air through the first antenna 311 and the second antenna 312. A first transmission signal may include a signal emitted through the first antenna 311 and a second transmission signal may include a signal emitted through the second antenna 312. Meanwhile, the reception signal may include a signal received by the electronic device 201 from the air through the first antenna 311 and the second antenna 312.

The first antenna 311 and the second antenna 312 may interdependently operate. Both the first antenna 311 and the second antenna 312 may transmit signals as transmitting sides or receive signals as receiving sides. The first antenna 311 and the second antenna 312 may simultaneously transmit or receive signals.

The first antenna 311 and the second antenna 312 may independently operate. The first antenna 311 may transmit a signal as a transmitting side and the second antenna 312 may receive a signal as a receiving side. The first antenna 311 and the second antenna 312 may transmit or receive signals at different timings.

Using both the first antenna 311 and the second antenna 312 may be advantageous in terms of improvement of transmission performance of the electronic device 201. However, the disclosure is not limited thereto, and only one of the two antennas may be used.

The transceiver 320 may generate the transmission signal. The transceiver 320 may carry a transmission data signal on a carrier and deliver a transmission signal including the transmission data signal and the carrier to the first antenna 311 and the second antenna 312. The transmission signal may be transmitted in electromagnetic form to the outside of the electronic device 201 through the first antenna 311 and the second antenna 312.

The transmission data signal may include data to be transmitted from the electronic device 201 to another electronic device or the BS.

In order to generate the transmission signal, the transceiver 320 may include an oscillator (not shown) for generating a carrier. The transceiver 320 may include a modulation circuit for performing a modulation task to carry the transmission data signal on the carrier generated by the oscillator. The transceiver 320 may include a RF amplifier for amplifying the modulated carrier in order to increase the strength of the transmission signal.

The transceiver 320 may process the reception signal. The transceiver 320 may receive the reception signal including a reception data signal and a carrier from the first antenna 311 and the second antenna 312 and extract data from the reception signal. The transceiver 320 may deliver the extracted data to the processor 210 or the memory 230.

The reception data signal may include data received by the electronic device 201 from another electronic device or the BS.

In order to process the reception signal, the transceiver 320 may include a demodulation circuit for performing a demodulation task to extract data from the reception signal. The RF amplifier may amplify the reception signal in order to easily extract the reception data from the reception signal.

The processor 210 may include a CP and control the transceiver 320. Accordingly, the processor 210 may perform the function of the cellular module 221.

The processor 210 may control the operation of the transceiver 320 for generating the transmission signal. The processor 210 may determine or generate data to be included in the transmission signal and deliver the data to the transceiver 320.

The processor 210 may determine a scheme of generating the transmission signal. The transceiver 320 may generate the transmission signal from the data determined or generated by the processor 210 according to the signal generation scheme determined by the processor 210. For example, when the processor 210 determines that the data is a voice format and the signal generation scheme is amplitude modulation (AM), the transceiver 320 may carry the voice data on the carrier in the AM scheme and generate the transmission signal.

In the scheme of generating the transmission signal, the processor 210 may determine a phase and a frequency of the transmission signal. The processor 210 may control the transceiver 320 such that the transmission signal has a specific phase and a specific frequency.

Specifically, the processor 210 may determine a phase and a frequency for each of the first transmission signal through the first antenna 311 and the second transmission signal through the second antenna 312. The electronic device 201 may transmit the first transmission signal through the first antenna 311 and the second transmission signal through the second antenna 312.

The processor 210 may control the transceiver 320 to compensate for the phase of the transmission signal. Specifically, the processor 210 may control the transceiver 320 to receive the part of the first transmission signal and the part of the second transmission signal through coupling of the first and second transmission signals. The processor 210 may control the transceiver 320 to calculate a correlation between the parts of the first and second transmission signals. The processor 210 may predict the radiation power that is finally radiated by the electronic device 201 based on the correlation and determine whether the predicted radiation power corresponds to a preset value. The processor 210 may control the transceiver 320 to adjust the phases of the first and second transmission signals until the predicted radiation power corresponds to the preset value.

According to various embodiments, the transceiver 320 may include a first phase shifter 321b and a second shifter 322b, and the processor 210 may be configured to control the phase of the first transmission signal through the first phase shifter 321b and the phase of the second transmission signal through the second phase shifter 322b.

According to various embodiments, the processor 210 may be configured to control the phase of the first transmission signal and the phase of the second transmission signal through one of the first phase shifter 321b and the second phase shifter 322b.

According to various embodiments, the transceiver 320 may include a first feedback port 320-11 and a second feedback port 320-12, and may be configured to acquire a first feedback transmission signal through the first feedback port 320-11 and a second feedback transmission signal through the second feedback port 320-12.

According to various embodiments, the electronic device 201 may include a first coupler 611 for delivering the first feedback transmission signal to the first feedback port 320-11 and a second coupler 612 for delivering the second feedback transmission signal to the second feedback port 320-12.

According to various embodiments, the electronic device 201 may include a first port switch 911 for selectively connecting the first coupler 611 to one of the first feedback port 320-11 and the second feedback port 320-12, and a second port switch 912 for selectively connecting the second coupler 612 to one of the first feedback port 320-11 and the second feedback port 320-12.

According to various embodiments, the processor 210 may be configured to acquire the second feedback transmission signal through the first feedback port 320-11 using the first port switch 911.

According to various embodiments, the processor 210 may be configured to acquire the first feedback transmission signal through the second feedback port 320-12 using the second port switch 912.

According to various embodiments, the processor 210 may be configured to change at least one of a first phase and a second phase during a call setup.

According to various embodiments, the processor 210 may be configured to determine whether the electronic device 201 operates in a weak electric field or a strong electric field, and may be configured to change at least one of the first phase and the second phase when the electronic device 201 operates in a weak electric field.

According to various embodiments, the processor 210 may be configured to control the first phase shifter 321b to fix the phase of the first signal through the transceiver 320 and identify a second correlation based on the fixed phase of the first signal.

According to various embodiments, the processor 210 may be configured to control the first phase shifter 321b to change the phase of the first signal through the transceiver 320 and identify the second correlation based on the changed phase of the first signal.

According to various embodiments, the processor 210 may be configured to control the second phase shifter 322b to change the phase of the second signal through the transceiver 320 and identify the second correlation based on the changed phase of the second signal.

Figure 4:
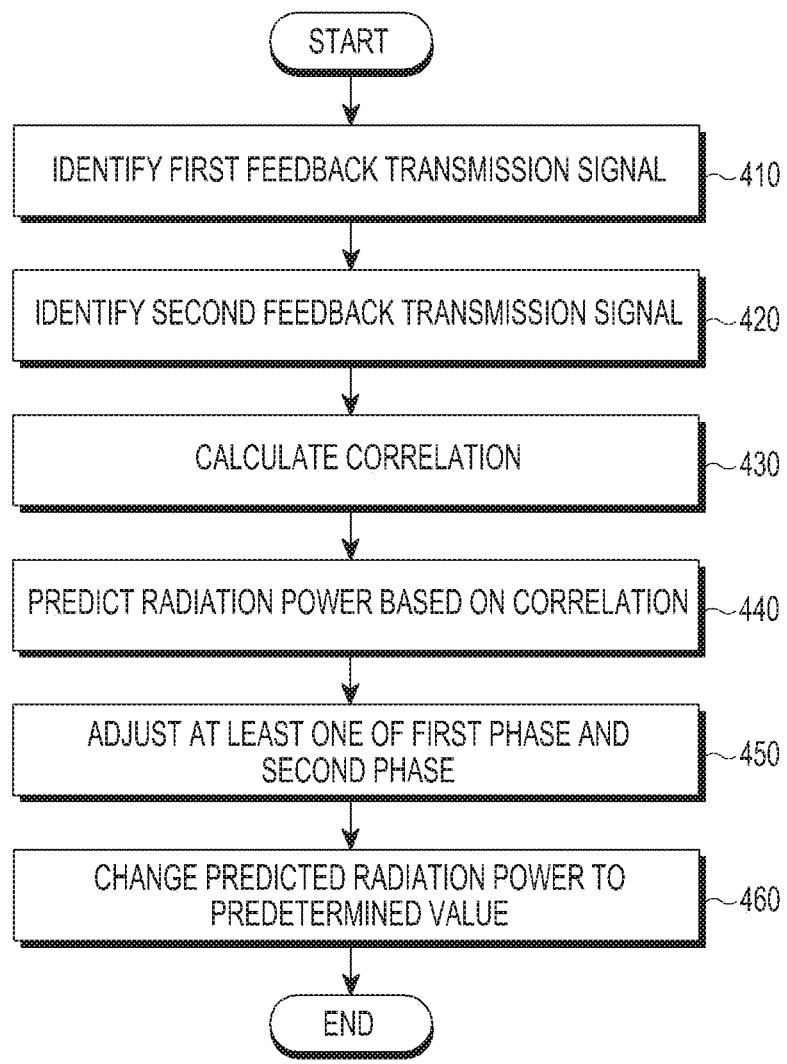
FIG. 4 is a flowchart illustrating a method of compensating for a phase of a transmission signal by the electronic device according to an embodiment of the disclosure.

FIG. 4 is a flowchart illustrating a method of compensating for a phase of a transmission signal by the electronic device according to an embodiment of the disclosure.

The method of compensating for the transmission signal of FIG. 4 will be described in more detail with reference to FIGS. 5, 6, and 7A to 7E.

In operation 410, the transceiver 320 may identify a first feedback transmission signal. The first feedback transmission signal may be acquired from the first transmission signal.

In operation 420, the transceiver 320 may identify a second feedback transmission signal. The second feedback transmission signal may be acquired from the second transmission signal.

In operation 430, the transceiver 320 may calculate a correlation based on the first feedback transmission signal and the second feedback transmission signal. A method of calculating the correlation will be described below with reference to FIGS. 7A to 7C.

In operation 440, the transceiver 320 may predict radiation power based on the correlation. In operation 450, the processor 210 may control the transceiver 320 to predict radiation power based on the correlation. A method of calculating the correlation and a method of predicting the radiation power will be described below with reference to FIGS. 7D and 7E.

In operation 460, the processor 210 of the electronic device 201 may identify whether the predicted radiation power is a predetermined value and change the radiation power into the predetermined value. A method of changing the predicted radiation power into the predetermined value will be described below.

First, a process of acquiring the first transmission signal and the second transmission signal will be described. Then, a process of identifying the first feedback transmission signal and the second feedback transmission signal will be described.

Figure 5:
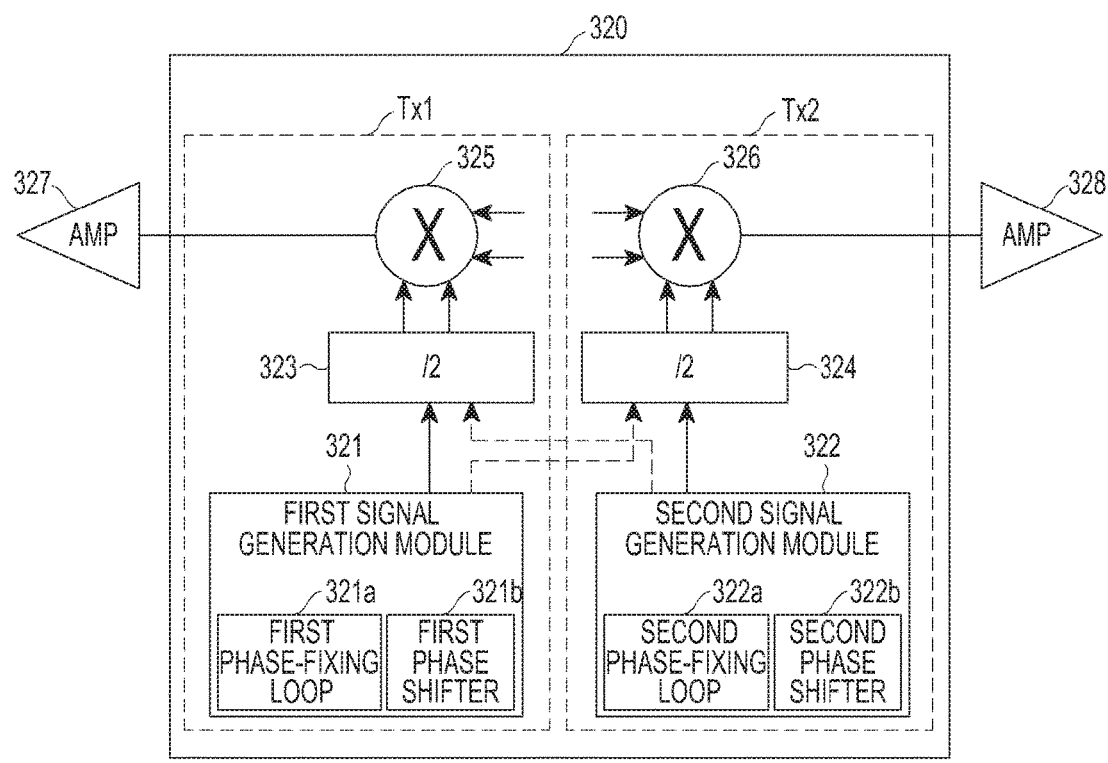
FIG. 5 is a block diagram illustrating a transceiver according to an embodiment of the disclosure.

FIG. 5 is a block diagram illustrating a transceiver according to an embodiment of the disclosure.

The first transmission signal and the second transmission signal may be generated by the transceiver 320 as described below.

Referring to FIG. 5, a detailed configuration of the transceiver 320 is illustrated. The transceiver 320 may include signal generation modules 321 and 322, frequency dividers 323 and 324, and mixers 325 and 326. The transceiver 320 may be connected to amplifiers 327 and 328.

The transceiver 320 may be divided into a first transmitting side (Tx1) and a second transmitting side (Tx2), and elements of the transceiver 320 may be included in each of the transmitting sides. According to various embodiments, the first transmitting side (Tx1) and the second transmitting side (Tx2) may be configured as a single transmitting side. The transceiver 320 may include the first signal generation module 321, the first frequency divider 323, and the first mixer 325 in the first transmitting side (Tx1). The transceiver 320 may be connected to the first amplifier 327 through the first mixer 325.

The transceiver 320 may include the second signal generation module 322, the second frequency divider 324, and the second mixer 326 in the second transmitting side (Tx2). The transceiver 320 may be connected to the second amplifier 328 through the second mixer 326.

The signal generation modules 321 and 322 may further include oscillators (not shown), phase-fixing loops 321a and 322a, and phase shifters 321b and 322b. The first signal generation module 321 may include a first oscillator (not shown), a first phase-fixing loop 321a, and a first phase shifter 321b. The second signal generation module 322 may include a second oscillator (not shown), a second phase-fixing loop 322a, and a second phase shifter 322b. Here, the oscillator conceptually includes a first oscillator and a second oscillator.

The oscillator (not shown) may generate a basic signal which will be a carrier of the transmission signal. The signal output by the oscillator may be named a source signal. The first oscillator (not shown) may output a first source signal which will be a carrier of the first transmission signal. The second oscillator (not shown) may output a second source signal which will be a carrier of the second transmission signal. The first source signal may have a first phase and the second source signal may have a second phase. In beamforming Tx diversity (BFTD) implementation, it may be preferable that the first phase be the same as the second phase.

The phase-fixing loops 321a and 322a may fix a frequency of the transmission signal to a specific value.

The phase-fixing loops 321a and 322a may receive the source signals from the oscillators (not shown). The first phase-fixing loop 321a may receive the first source signal from the first oscillator (not shown). The second phase-fixing loop 322a may receive the second source signal from the second oscillator (not shown).

The phase-fixing loops 321a and 322a may consistently maintain the frequencies of the source signals by continuous circulation through a negative feedback circuit until the source signals match the reference frequency.

Specifically, the first phase-fixing loop 312a may fix the frequency of the first source signal and the second phase-fixing loop 322a may fix the frequency of the second source signal.

The first phase-fixing loop 321a may deliver the first source signal having the fixed frequency to the first frequency divider 323. The second phase-fixing loop 322a may deliver the second source signal to the second frequency divider 324.

Further, the phase shifters 321b and 322b may change phases of the transmission signals to other values. Specifically, the processor 210 may determine whether to change at least one of the phases of the first transmission signal and the second transmission signal and determine a new phase. The first phase shifter 321b and the second phase shifter 322b may change at least one of the first phase of the first source signal corresponding to the first transmission signal and the second phase of the second source signal corresponding to the second transmission signal to the new phase according to the determination of the processor 210.

The phase of the transmission signal may be the same as the phase of the source signal. Specifically, the phase of the first transmission signal may be the same as the phase of the first source signal, and the phase of the second transmission signal may be the same as the phase of the second source signal.

Accordingly, adjusting the phase of the first transmission signal may mean adjusting the phase of the first source signal. Also, adjusting the phase of the second transmission signal may mean adjusting the phase of the second source signal. That is, in order to change the phase of at least one of the first transmission signal or the second transmission signal, the processor 210 may control the transceiver 320 to change the phase of at least one of the first source signal and the second source signal.

For example, the first signal generation module 321 may generate the first source signal through the first oscillator, the first phase-fixing loop 321a may fix the frequency of the first source signal, and the first phase shifter 321b may change the phase of the first source signal.

The frequency dividers 323 and 324 may transform frequencies of the source signals. The frequency dividers 323 and 324 may receive the source signals, transform frequencies of the received source signals into frequencies suitable as carriers, and output carrier signals having the transformed frequencies. Specifically, the first frequency divider 323 may receive the first source signal, transform the frequency of the received first source signal into a frequency suitable as the carrier, and output a first carrier signal having the transformed frequency. The second frequency divider 324 may receive the second source signal, transform the frequency of the received second source signal into a frequency suitable as the carrier, and output a second carrier signal having the transformed frequency.

In signal transmission of RF communication, since a high frequency provides stable and rapid signal transmission, a frequency suitable as the carrier may include such a high frequency. Accordingly, the frequency dividers 323 and 324 may include frequency multipliers and output carrier signals having frequencies double or triple the frequencies of the received source signals.

In order to carry data on the carrier signals, the mixers 325 and 326 may insert transmission data signals into the carrier signals. The mixers 325 and 326 may receive the carrier signals from the frequency dividers 323 and 324. The mixers 325 and 326 may receive the transmission data signals separately from the carrier signals. The mixers 325 and 326 may generate transmission signals suitable for space propagation by combining the transmission data signals with the carrier signals. The transmission data signal may include information that the electronic device 201 desires to transmit.

Specifically, the first mixer 325 and the second mixer 326 may combine the first carrier signal and the second carrier signal with the transmission data signals. The first mixer 325 may generate the first transmission signal by combining the first carrier signal with the first transmission data signal including information and deliver the first transmission signal to the first amplifier 327. The second mixer 326 may generate the second transmission signal by combining the second carrier signal with the second transmission data signal including information and deliver the second transmission signal to the second amplifier 328. Preferably, the first transmission data signal and the second transmission data signal may include the same information.

The amplifiers 327 and 328 may amplify the strength of the transmission signals or the reception signals. The transmission signal is radiated with suitable maximum power and then only reaches a target spot. Accordingly, if the amplifiers 327 and 328 are the part of the transmitting sides, a power amplifier (PA) is suitable. The reception signal has substantially weak strength and may receive influence by attenuation or noise during reception. Accordingly, if the amplifiers 327 and 328 are the part of the receiving sides, a LNA is suitable.

Specifically, the first amplifier 327 and the second amplifier 328 may amplify the first transmission signal and the second transmission signal. The first amplifier 327 may receive the first transmission signal from the first mixer 325, amplify the received first transmission signal, and deliver the amplified first transmission signal to the first antenna 311. The second amplifier 328 may receive the second transmission signal from the second mixer 326, amplify the received second transmission signal, and deliver the amplified second transmission signal to the second antenna 312.

Next, it will be described below how the transceiver 320 identifies the first feedback transmission signal from the first transmission signal and the second feedback transmission signal from the second transmission signal.

Figure 6:
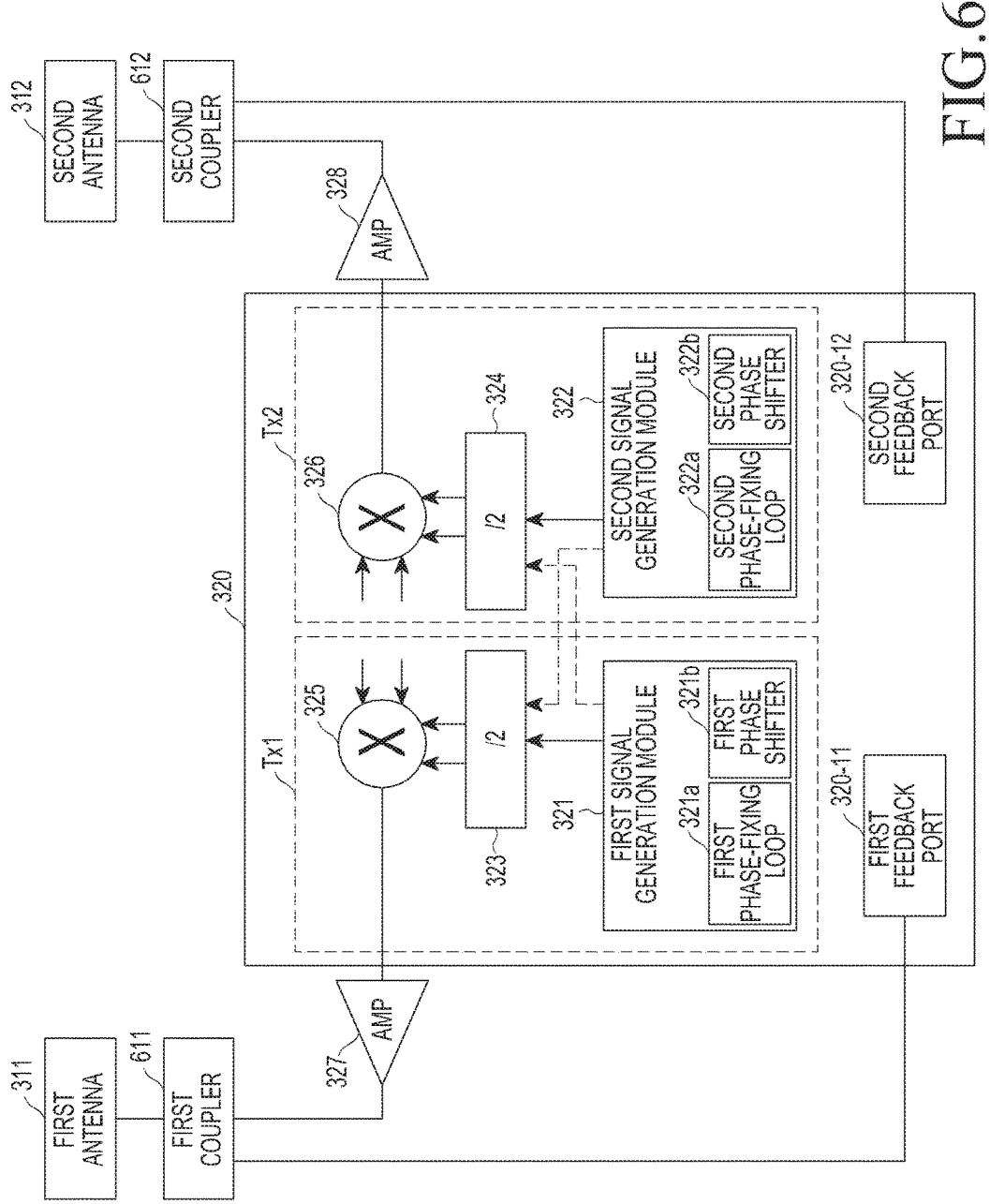
FIG. 6 is a block diagram illustrating the electronic device including the transceiver according to an embodiment of the disclosure.

FIG. 6 is a block diagram illustrating the electronic device including the transceiver according to an embodiment of the disclosure.

Referring to FIG. 6, the electronic device 201 may include couplers 611 and 612, and the transceiver 320 may include feedback ports 320-11 and 320-12.

In order to compensate for a phase difference of the transmission signal, the transceiver 320 may detect each of the first feedback transmission signal, which is the part of the first transmission signal, and the second feedback transmission signal, which is the part of the second transmission signal. In order to detect the first and second feedback transmission signals, the electronic device 201 may include the couplers 611 and 612, and the transceiver 320 may include the feedback port 320-11 and 320-12.

The couplers 611 and 612 may include the first coupler 611 for the first feedback transmission signal and the second coupler 612 for the second feedback transmission signal. The feedback ports 320-11 and 320-12 may include the first feedback port 320-11 for the first transmission signal and the second feedback port 320-12 for the second feedback transmission signal.

The first coupler 611 may be connected between the first antenna 311 and the first amplifier 327, and may receive the first transmission signal from the first amplifier 327. The first coupler 611 may be connected between the first antenna 311 and the first feedback port 320-11, and may deliver the first feedback transmission signal to the first feedback port 320-11.

The second coupler 612 may be connected between the second antenna 312 and the second amplifier 328, and may receive the second transmission signal from the second amplifier 328. The second coupler 612 may be connected between the second antenna 312 and the second feedback port 320-12, and may deliver the second feedback transmission signal to the second feedback port 320-12.

The first coupler 611 may receive the first transmission signal from the first amplifier 327 and deliver the first transmission signal to the first antenna 311. The first coupler 611 may cause the part of the first transmission signal delivered from the first amplifier 327 to branch and deliver the part to the first feedback port 320-11. That is, the part of the first transmission signal may be fed back to the first feedback port 320-11 from the first coupler 611.

The second coupler 612 may receive the second transmission signal from the second amplifier 328 and deliver the second transmission signal to the second antenna 312. The second coupler 612 may cause the part of the second transmission signal delivered from the second amplifier 328 to branch and deliver the part to the second feedback port 320-12. That is, the part of the second transmission signal may be fed back to the second feedback port 320-12 from the second coupler 612.

The first feedback transmission signal may include the part of the first transmission signal and the second feedback transmission signal may include the part of the second transmission signal. Accordingly, while the strength and power of the first feedback transmission signal may be weaker than those of the first transmission signal, the frequency and phase of the first feedback transmission signal may be the same as those of the first transmission signal. Further, while the strength and power of the second feedback transmission signal may be weaker than those of the second transmission signal, the frequency and phase of the second feedback transmission signal may be the same as those of the second transmission signal.

In operation 430, the transceiver 320 may calculate a correlation between the first feedback transmission signal and the second feedback transmission signal.

For example, the transceiver 320 may perform a convolution operation on the first feedback transmission signal and the second feedback transmission signal.

In operation 440, the processor 210 may predict radiation power radiated from the electronic device 201 based on the correlation.

In predicting the radiation power, the processor 210 may consider the correlation as a measure of the radiation power.

The correlation and the radiation power may be specific values (for example, absolute values). When the correlation has a first value, the radiation power may have a second value. The second value may be different from the first value.

For example, the processor 210 may consider the result of the convolution operation as the correlation. The processor 210 may determine the radiation power (for example, a strength or magnitude of the radiation power) by converting the value (correlation) of the convolution operation. When the value of the convolution operation has a first value, the converted value of the convolution operation may have a second value different from the first value.

In another example, the processor 210 may use the value (correlation) of the convolution operation and table data indicating a value that matches the value of the convolution operation. When the value of the convolution operation has a first value, the matching value may have a second value different from the first value. When the value of the convolution operation has the first value, the processor 210 may determine that the second value is the radiation power.

The method of predicting the radiation power based on the correlation is not limited to the present embodiment, and various methods may be included.

According to various embodiments, in predicting the radiation power, the processor 210 may determine whether the radiation power is the maximum or the minimum based on the correlation.

In order to determine whether the radiation power is the maximum or the minimum, the processor 210 may use a preset value. The preset value may include a maximum value or a minimum value of the correlation. Further, the preset value may include a maximum value or a minimum value of the radiation power.

For example, when the value (correlation) of the convolution operation corresponds to a value preset as the maximum value, the processor 210 may determine that the radiation power is the maximum at that time. When the value (predicted radiation power) converted from the value of the convolution operation corresponds to a value preset as the maximum value, the processor 210 may determine that the radiation power is the maximum at that time. Alternatively, when the matching value acquired from the table data corresponds to a value preset as the maximum value, the processor 210 may determine the radiation power is the maximum at that time.

The value preset as the maximum value of the correlation may be the same as the highest value among correlations calculated by the electronic device 201 many times during a specific period. The value preset as the minimum value of the correlation may be the same as the lowest value among correlations calculated by the electronic device 201 many times during a specific period.

In operation 450, the processor 210 may adjust the phase of at least one of the first phase of the first transmission signal and the second phase of the second transmission signal.

Preferably, the processor 210 may determine whether to adjust at least one phase and control the transceiver 320 to adjust the at least one phase. The shifters 321b and 322b of the transceiver 320 may directly adjust at least one of the first phase and the second phase under the control of the processor 210.

For example, the processor 210 may determine whether the predicted radiation power corresponds to a predetermined value. When the predicted radiation power corresponds to the predetermined value, the processor 210 may control the transceiver 320 not to adjust the phase. When the radiation power does not correspond to the predetermined value, the processor 210 may control the transceiver 320 to adjust the phase.

In the example using the convolution operation in order to calculate the correlation, it is assumed that the predetermined value is the maximum value of the radiation power.

When the first value, which is the value of the convolution operation, is not the predetermined value, the processor 210 may determine that the radiation power is not the maximum at that time. When the second value, which is the value converted from the value of the convolution operation, is not the predetermined value, the processor 210 may determine that the radiation power is not the maximum at that time. When the second value, which is the matching value acquired from the table data, is not the predetermined value, the processor 210 may determine that the radiation power is not the maximum at that time. The processor 210 may control the transceiver 320 to adjust at least one of the first phase and the second phase.

The transceiver 320 may change both the first phase and the second phase, but it may be reasonable to fix one of the first phase and the second phase and change the other.

The maximum value of the radiation power may mean, for example, power in the case in which interference between the first and second transmission signals radiated by the electronic device 201 through the first antenna 311 and the second antenna 312 is the lowest. For example, when the electronic device 201 radiates the first transmission signal through the first antenna 311 and the second transmission signal through the second antenna 312, the first and second transmission signals may not be transmitted with desired power due to interference by a phase difference between the first and second transmission signals. At this time, by adjusting the phase of the first transmission signal or the second transmission signal, the electronic device 201 may radiate the first and second transmission signals to the receiving side (for example, BS) with as much power as possible (for example, not to generate the phase difference between the two transmission signals).

In operation 460, the electronic device 201 may change the predicted radiation power to a predetermined value.

It is assumed that the transceiver 320 calculates the correlation of the first value in operation 430, that the processor 210 predicts the second value as the radiation power in operation 440, and that the transceiver 320 changes only the second phase without changing the first phase in operation 450.

The electronic device 201 may perform operations 410 to 450 again as described below.

The transceiver 210 may deliver the first transmission signal to the first antenna 311 without changing the phase of the first transmission signal. The transceiver 210 may generate the second transmission signal having the changed phase and deliver the second transmission signal to the second antenna 311.

The first coupler 611 may couple the first transmission signal and extract the part of the first transmission signal. The transceiver 210 may receive the part of the first transmission signal as the first feedback transmission signal through the first feedback port 320-11 in operation 410.

The second coupler 612 may couple the second transmission signal having the changed phase and extract the part of the second transmission signal. The transceiver 210 may receive the part of the second transmission signal as the second feedback transmission signal through the second feedback port 320-12 in operation 420.

The transceiver 210 may calculate the correlation between the first feedback signal and the second feedback transmission signal having the changed phase again. The transceiver 320 may calculate the correlation of a third value again in operation 430.

The processor 210 may predict a fourth value as the radiation power based on the correlation of the third value in operation 440.

When the fourth value does not correspond to a predetermined value, the processor 210 may control the transceiver 320 to change the second phase again in operation 450.

While changing at least one of the phase of the first transmission signal and the phase of the second transmission signal, the electronic device 201 may continuously monitor whether the radiation power reaches the maximum based on the correlation for the part of the two signals.

Operations 430 to 460 will be described below in detail with reference to FIGS. 7A to 7E.

Figure 7A:
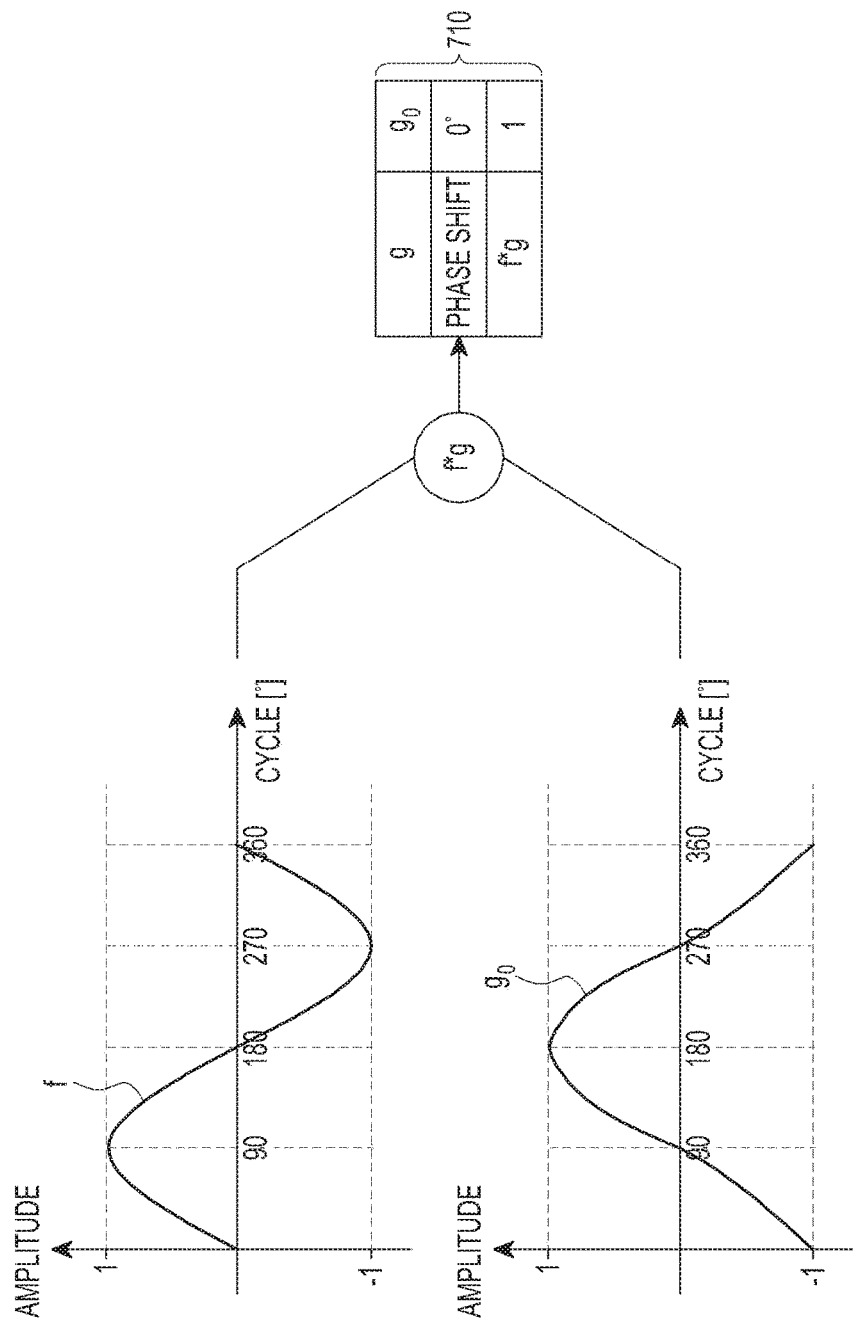
FIG. 7A is a conceptual diagram illustrating the calculation of the correlation according to an embodiment of the disclosure.

FIG. 7A is a conceptual diagram illustrating the calculation of the correlation according to an embodiment of the disclosure.

Referring to FIG. 7A, a power waveform of the first feedback transmission signal and a power waveform of the second feedback transmission signal are illustrated. Further, a process in which the transceiver 320 calculates the correlation based on the convolution operation is illustrated.

The transceiver 320 may receive a first feedback transmission signal (f) from the first coupler 611 and a second feedback transmission signal (g0) from the second coupler 612. The first feedback transmission signal (f) and the second feedback transmission signal (g0) may have the same cycle of 360 degrees and the same power strength of amplitude 1.

The first feedback transmission signal (f) precedes the second feedback transmission signal (g0) by 90 degrees. That is, the phase difference between the first feedback transmission signal (f) and the second feedback transmission signal (g0) is 90 degrees. This means that the first transmission signal precedes the second transmission signal by 90 degrees and that the phase difference between the two signals is 90 degrees.

The transceiver 320 may perform a convolution operation (f*g) on the first feedback transmission signal (f) and the second feedback transmission signal (g0). The transceiver 320 may acquire a convolution operation value of 1.

The processor 210 may predict the radiation power from the convolution operation value of 1.

Meanwhile, the transceiver 320 may generate correlation data 710 including the convolution operation value. The correlation data 710 may indicate that the convolution operation (f*g) is performed on the first feedback transmission signal (f) and the second feedback transmission signal (g0) at that time, neither the first phase (phase of the first transmission signal) and the second phase (phase of the second transmission signal) are adjusted (phase shift is 0 degrees), and that the convolution operation value is 1.

Figure 7B:
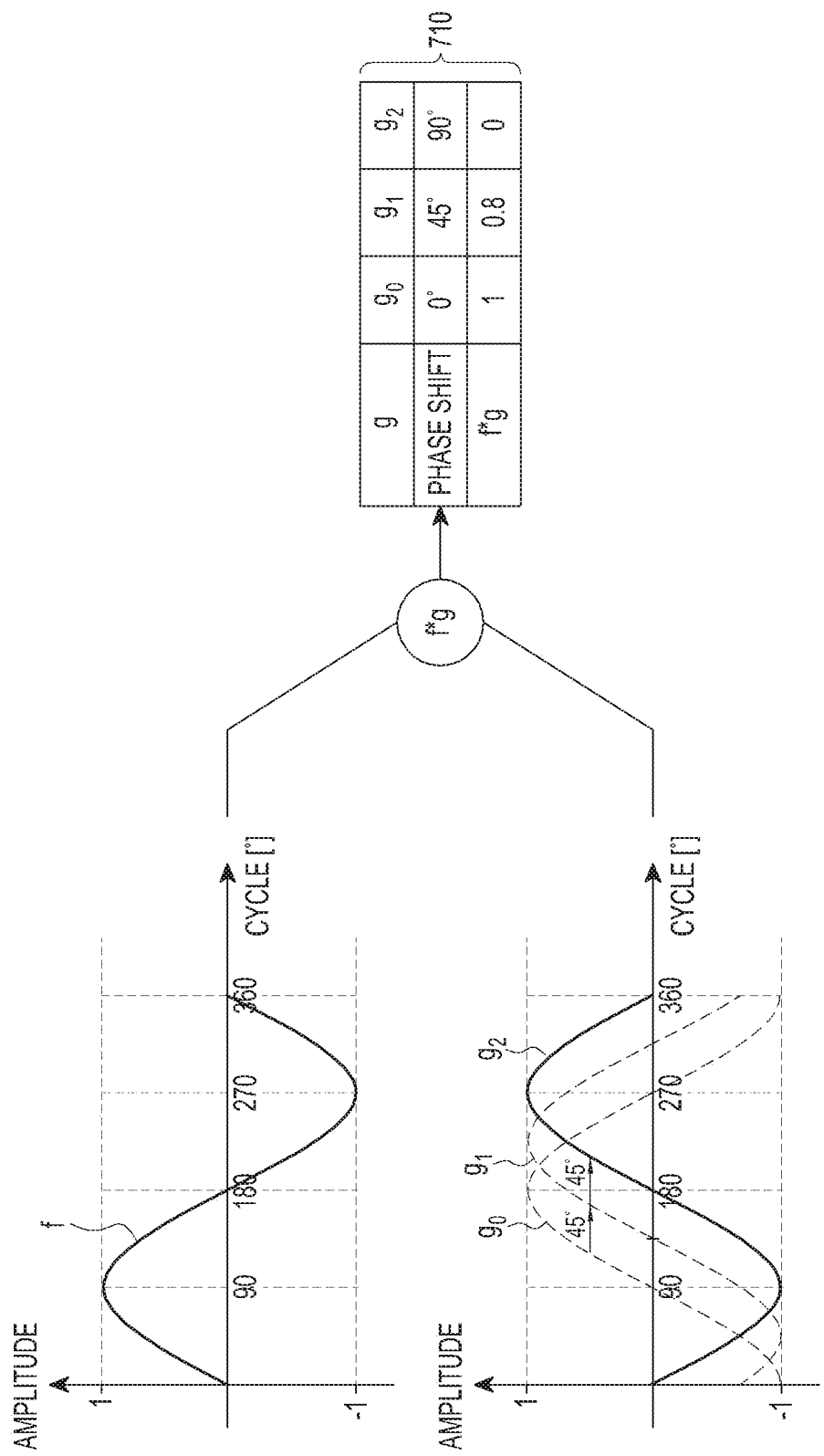
FIG. 7B is a conceptual diagram illustrating the phase adjustment and the correlation calculation according to an embodiment of the disclosure.

FIG. 7B is a conceptual diagram illustrating the phase adjustment and the correlation calculation according to an embodiment of the disclosure.

Referring to FIG. 7B, when it is determined that the radiation power predicted by the processor 210 based on the convolution operation value of 1 is not the predetermined value, the second phase is adjusted and the convolution operation is performed again on the adjusted second phase.

The processor 210 may control the transceiver 320 such that the second phase is behind the phase by 45 degrees according to the related art. The transceiver 320 may adjust the second phase of the second transmission signal to be delayed by 45 degrees through the second phase shifter 322b, deliver the second transmission signal to the second antenna 312, and receive a second feedback transmission signal (g1) of which the phase is behind the phase of the second feedback transmission signal (g0) by 45 degrees from the second coupler 612.

The transceiver 320 may perform the convolution operation (f*g) on the first feedback transmission signal (f) and the second feedback transmission signal (g1). The transceiver 320 may acquire a convolution operation value of 0.8.

The processor 210 may predict the radiation power from the convolution operation value of 0.8.

Meanwhile, the transceiver 320 may add the re-calculated convolution operation value to the correlation data 710. The correlation data 710 may indicate that the convolution operation (f*g) is performed on the first feedback transmission signal (f) and the second feedback transmission signal (g1) at that time, that the second phase (phase of the second transmission signal) is adjusted by 45 degrees (phase shift is 45 degrees), and that the convolution operation value is 0.8.

When it is determined that the radiation power predicted by the processor 210 based on the convolution operation value of 0.8 is not the predetermined value, the second phase may be adjusted and the convolution operation may be performed on the adjusted second phase.

The processor 210 may control the transceiver 320 such that the second phase is delayed by 90 degrees (further behind by 45 degrees). The transceiver 320 may adjust the second phase of the second transmission signal to be delayed by 90 degrees through the second phase shifter 322b, deliver the second transmission signal to the second antenna 312, and receive a second feedback transmission signal (g2) of which the phase is behind the phase of the second feedback transmission signal (g0) by 90 degrees from the second coupler 612.

The transceiver 320 may perform the convolution operation (f*g) on the first feedback transmission signal (f) and the second feedback transmission signal (g2). The transceiver 320 may acquire a convolution operation value of 0.

The processor 210 may predict the radiation power from the convolution operation value of 0.

Meanwhile, the transceiver 320 may add the re-calculated convolution operation value to the correlation data 710. The correlation data 710 may indicate that the convolution operation (f*g) is performed on the first feedback transmission signal (f) and the second feedback transmission signal (g2) at that time, that the second phase (phase of the second transmission signal) is adjusted by 90 degrees (phase shift is 90 degrees), and that the convolution operation value is 0.

Figure 7C:
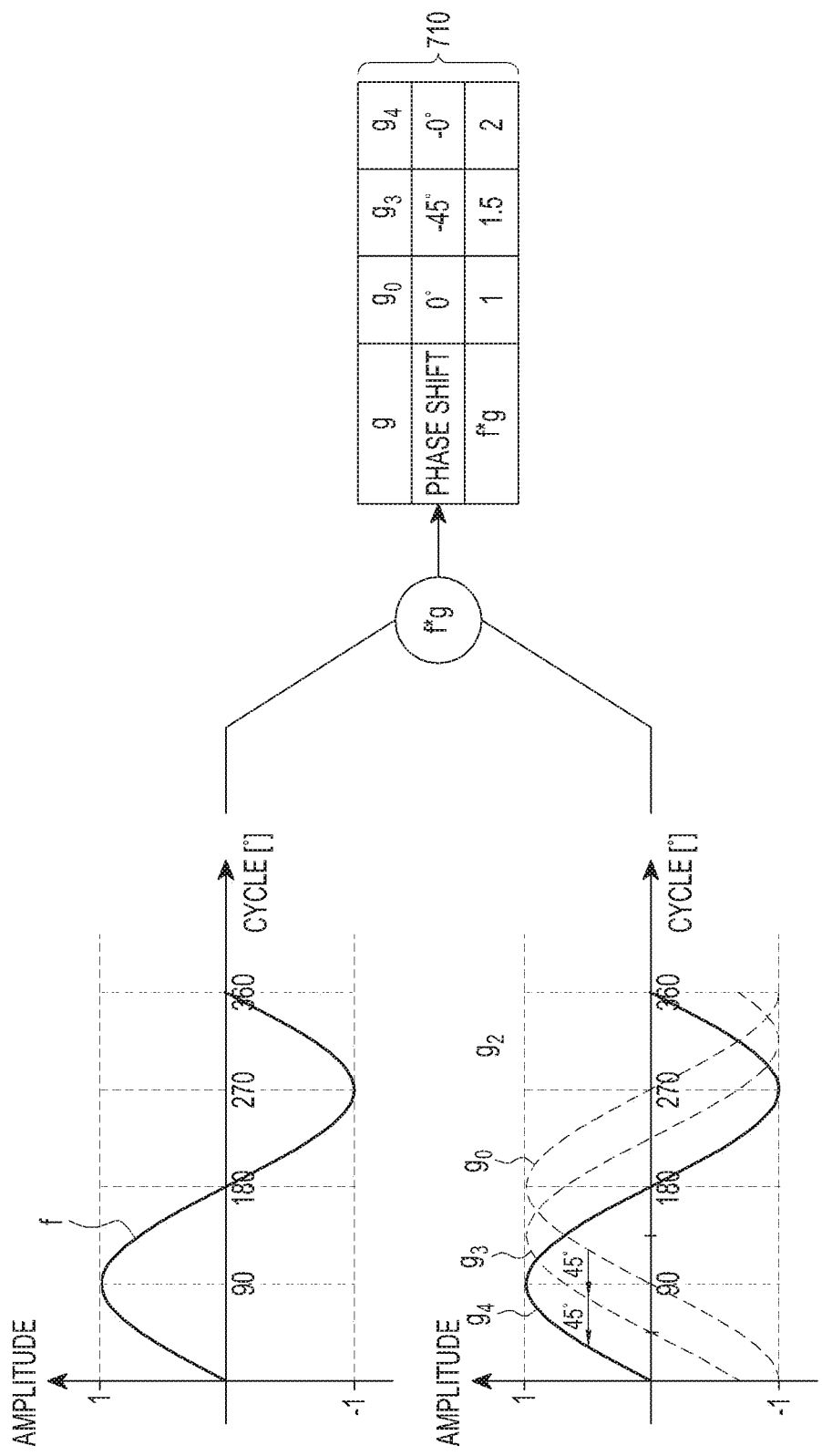
FIG. 7C is a conceptual diagram illustrating the phase adjustment and the correlation calculation according to an embodiment of the disclosure.

FIG. 7C is a conceptual diagram illustrating the phase adjustment and the correlation calculation according to an embodiment of the disclosure.

Referring to FIG. 7C, when it is determined that the radiation power predicted by the processor 210 based on the convolution operation value of 1 is not the predetermined value, the second phase may be adjusted, and the convolution operation may be performed again on the adjusted second phase.

However, FIG. 7C has a difference from FIG. 7B in that the second phase is controlled to be advanced.

The processor 210 may control the transceiver 320 such that the second phase is ahead of the phase by 45 degrees according to the related art.

The transceiver 320 may receive a second feedback transmission signal (g3) that is ahead of the second feedback transmission signal (g0) by 45 degrees from the second coupler 612.

The transceiver 320 may perform the convolution operation (f*g) on the first feedback transmission signal (f) and the second feedback transmission signal (g3). The transceiver 320 may acquire a convolution operation value of 1.5.

The processor 210 may predict the radiation power from the convolution operation value of 1.5.

Meanwhile, the transceiver 320 may add the re-calculated convolution operation value to the correlation data 710. The correlation data 710 may indicate that the convolution operation (f*g) is performed on the first feedback transmission signal (f) and the second feedback transmission signal (g3) at that time, that the second phase (phase of the second transmission signal) is adjusted by −45 degrees (phase shift is −45 degrees), and that the convolution operation value is 1.5.

Similarly, the convolution operation may be performed on a first feedback transmission signal (g4) having the second phase ahead by 90 degrees (ahead of the phase of g3 by 45 degrees). The transceiver 320 may add the convolution operation value of 2 to the correlation data 710.

FIG. 7D is a conceptual diagram illustrating the radiation power prediction through the correlation according to an embodiment of the disclosure.

Referring to FIG. 7D, the correlation data 710 including convolution operation values calculated according to the adjusted second phase is illustrated. The correlation data 710 may include convolution operation values calculated by the electronic device 201 whenever the second phase is adjusted by 45 degrees for one cycle (360 degrees).

The correlation data 710 may be calculated in advance by the transceiver 320 and the processor 210 as described with reference to FIGS. 7A to 7C and may be stored in the memory 230. Alternatively, the correlation data 710 may be determined in advance and stored in the memory 230.

For predicting the radiation power, the correlation data 710 may be used.

For example, when the calculated correlation is 2, the processor 210 may determine that the radiation power of the electronic device 201 is the maximum at that time. This is because the processor 210 considers a radiation power value (Pmax) having the highest correlation as the maximum value of the radiation power.

For example, when the calculated correlation is 0, the processor 210 may determine that the radiation power of the electronic device 201 is the minimum at that time. This is because the processor 210 considers a radiation power value (Pmin) having the lowest correlation as the minimum value of the radiation power.

FIG. 7E is a conceptual diagram illustrating the radiation power prediction through the correlation according to an embodiment of the disclosure.

Referring to FIG. 7E, radiation power data 720 including convolution operation values calculated according to the adjusted second phases and values (P1, P2, P3, . . . , and P9) of the radiation power related to the convolution operation values are illustrated.

The values (P1, P2, P3, . . . , and P9) of the radiation power may include converted values of the convolution operation.

Alternatively, the values (P1, P2, P3, . . . , and P9) of the radiation power may correspond to matching values indicating the strength (or magnitude) of the radiation power corresponding to the convolution operations values. Accordingly, the radiation power data 720 may include data in a table form.

The processor 210 may determine the converted value by converting the convolution operation value through a specific algorithm. The matching value may be calculated or determined in advance and stored in the memory 230.

For predicting the radiation power, the radiation power data 720 may be used.

For example, when the calculated correlation is 2, the processor 210 may determine that the radiation power of the electronic device 201 is P3g at that time. This is because the processor 210 considers the value (P3) of the radiation power corresponding to the correlation of 2 as the strength or magnitude of the radiation power.

For example, when the calculated correlation is 0, the processor 210 may determine that the radiation power of the electronic device 201 is P7 at that time. This is because the processor 210 considers the value (P7) of the radiation power corresponding to the correlation of 0 as the strength or magnitude of the radiation power.

Meanwhile, since the electronic device 201 should implement BFTD as well as carrier aggregation (CA), the transceiver 320 may include the two signal generation modules 321 and 322. When the electronic device 201 implements BFTD, both the first signal generation module 321 and the second signal generation module 322 may be used. At this time, although the first signal generation module 321 generates the first source signal and the second signal generation module 322 generates the second source signal in a manner such that the first phase and the second phase are the same as each other or such that there is no difference between the first phase and the second phase, the first transmission signal finally emitted from the first antenna 311 and the second transmission signal finally emitted from the second antenna 312 may have a phase difference therebetween. The phase difference may be caused by a time delay generated during a process in which the first and second source signals become the first and second transmission signals. The time delay may be caused by a difference between physical paths from the transceiver 320 to the antennas 411 and 412. The difference between the first phase and the second phase may act as a disadvantage in implementing BFTD.

Further, although the first transmission signal and the second transmission signal are compensated for to prevent a phase difference therebetween, the phase difference may be caused again once the transceiver 320 is reset.

Table 1 shows the result of 10 measurements of conduction power indicating a sum of power of two transmission signals of 20 dBm when an RF cable of the electronic device 201 is reconnected under a condition of two antennas and a bandwidth 10 MHz.

TABLE 1

| $1^{th}$ | $2^{nd}$ | $3^{rd}$ | $4^{th}$ | $5^{th}$ | $6^{th}$ | $7^{th}$ | $8^{th}$ | $9^{th}$ | $10^{th}$ |
|---|---|---|---|---|---|---|---|---|---|
| 25.9 | 25.85 | 25.81 | 16.57 | 25.8 | 25.75 | 25.8 | 16.5 | 16.34 | 25.87 |

Referring to Table 1 above, even though the conduction power should become 25 dBm, the conduction power fails to reach 20 dBm a total of three times.

Table 2 shows the result of 10 measurements of conduction power indicating a sum of power for two transmission signals of 20 dBm when the electronic device 201 is turned on-off in airplane mode under a condition of two antennas and a bandwidth 10 MHz.

TABLE 2

| $1^{th}$ | $2^{nd}$ | $3^{rd}$ | $4^{th}$ | $5^{th}$ | $6^{th}$ | $7^{th}$ | $8^{th}$ | $9^{th}$ | $10^{th}$ |
|---|---|---|---|---|---|---|---|---|---|
| 25.85 | 16.45 | 25.84 | 25.81 | 25.83 | 16.11 | 16.2 | 25.84 | 16.37 | 25.84 |

Referring to Table 2, the conduction power fails to reach 20 dBm a total of four times.

Table 3 shows the result of 10 measurements of conduction power indicating a sum of power for two transmission signals of 20 dBm when the electronic device 201 is turned on-off under a condition of two antennas and a bandwidth of 10 MHz.

TABLE 3

| 1th | 2nd | 3rd | 4th | 5th | 6th | 7th | 8th | 9th | 10th |
|---|---|---|---|---|---|---|---|---|---|
| 25.86 | 25.88 | 16.12 | 25.86 | 15.05 | 25.84 | 15.52 | 15.8 | 15.3 | 15.5 |

Referring to Table 3 above, the conduction power fails to reach 20 dBm a total of six times.

As shown in Table 1 to Table 3, if loss occurs even in the conduction power, it may be predicted that radiation power, which is the power of the signals emitted from the antennas 311 and 312, falls short of the power design. Accordingly, if there is no compensation for the phase difference between the first transmission signal and the second transmission signal, the use of a plurality of transmission signals may further deteriorate the radiation power rather than the use of a single transmission signal.

Figure 8:
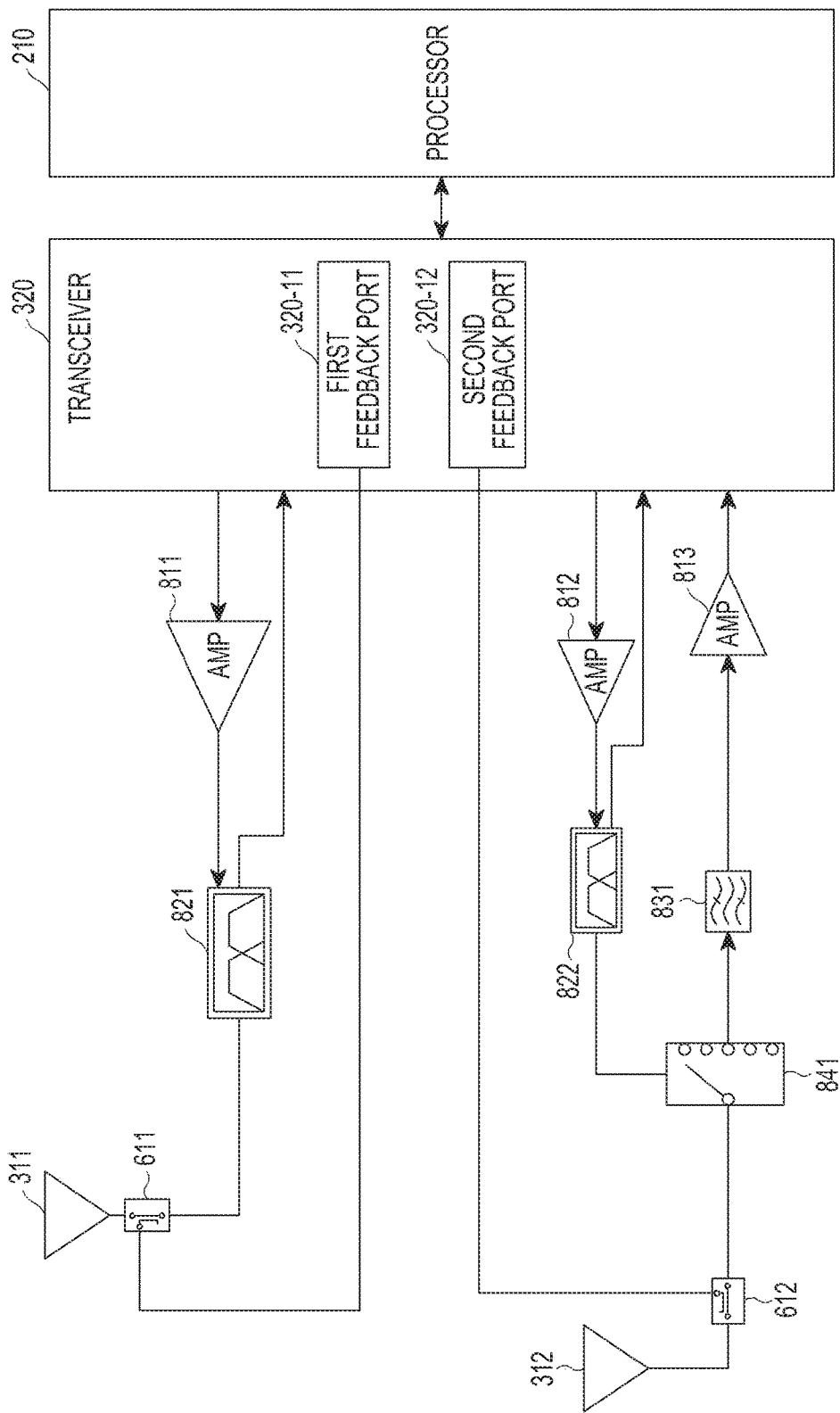
FIG. 8 is a detailed block diagram illustrating the electronic device including the transceiver according to an embodiment of the disclosure.

FIG. 8 is a detailed block diagram illustrating the electronic device including the transceiver according to an embodiment of the disclosure.

Referring to FIG. 8, the configuration of the electronic device 201 is illustrated in detail. The electronic device 201 may include amplifiers 811, 812, and 813, duplexers 821 and 822, a filter 831, and a switch 841, in addition to the first antenna 311, the second antenna 312, the transceiver 320, and the processor 210. The amplifiers 811, 812, and 813, the duplexers 821 and 822, the filter 831, and the switch 841 may be included in the communication module 220 or the RF module 229 of FIG. 2. The connection relation between the elements illustrated in FIG. 8 is only an example, and may change according to the design without being limited thereto.

The amplifiers 811, 812, and 813 may amplify the transmission signals at the transmitting side. The amplifiers 811, 812, and 813 may receive the transmission signals from the transmission ports of the transceiver 320, amplify the transmission signals, and deliver the amplified transmission signals to the duplexers 821 and 822. The amplifiers 811 and 812 may include a PA due to the characteristics of the transmitting side function.

The amplifiers 811, 812, and 813 may amplify the reception signals at the receiving side. The amplifier 813 may receive the reception signal from the filter 831, amplify the reception signal, and deliver the amplified reception signal to the reception port of the transceiver 320. The amplifier 813 may include a LNA due to the characteristics of the receiving side function.

The amplifiers 811, 812, and 813 and the duplexers 821 and 822 may include other types according to a frequency band of the transmission signal or a communication scheme.

The amplifier 811 may include a PA of a multi-mode multi-band (MMMB) type. The duplexers 821 and 822 may include a high-band (HB) duplexer, a middle-band (MB) duplexer, or a low-band (LB) duplexer. The amplifier 811 may receive the transmission signal from the transceiver 320 and deliver the transmission signal to the duplexer 821.

The amplifier 812 may include a PA dedicated for BFTD. The amplifier 812 may receive the transmission signal from the transceiver 320 and deliver the transmission signal to the duplexer 822.

The amplifier 813 may include an LNA, and the filter 831 may include a surface acoustic wave (SAW). The filter 831 may include a high-band filter, a middle-band filter, or a low-band filter. The amplifier 813 may receive the reception signal from the filter 831 and deliver the reception signal to the reception port of the transceiver 320.

The duplexers 821 and 822 may make the transmission signal and the reception signal branch. When the antennas 311 and 312 transmit signals, the duplexers 821 and 822 may make the transmission signal pass therethrough. When the antennas 311 and 312 receive signals, the duplexers 821 and 822 may make the reception signal pass therethrough. The duplexers 821 and 822 may deliver the transmission signals to the antennas 311 and 312 from the transceiver 320. The duplexers 821 and 822 may deliver the reception signals to the transceiver 320 from the antennas 311 and 312.

The duplexer 821 may receive the transmission signal from the amplifier 811 and deliver the transmission signal to the first antenna 311 via the first coupler 611. The duplexer 821 may receive the reception signal from the first antenna 311 via the first coupler 611 and deliver the reception signal to the transceiver 320.

The duplexer 822 may receive the transmission signal from the amplifier 812 and deliver the transmission signal to the second antenna 312 via the switch 841 and the second coupler 612. The duplexer 822 may receive the reception signal from the second antenna 312 via the second coupler 612 and the switch 841 and deliver the reception signal to the transceiver 320.

The filter 831 may filter the transmission signal and the reception signal on a specific frequency or frequency band. The filter 831 may receive the reception signal with noise, filter a frequency band including the noise, and generate the reception signal including the frequency band including data. The filter 831 may receive the reception signal from the second antenna 312 via the second coupler 612 and the switch 841 and deliver the reception signal to the amplifier 813.

The switch 841 may switch a signal transmitted between devices. The switch 841 may receive the transmission signal from the duplexer 822 and deliver the transmission signal to the second antenna 312 through the second coupler 612. The switch 841 may receive the reception signal from the second antenna 312 through the second coupler 612 and deliver the reception signal to the duplexer 822 and the filter 831.

Figure 9A:
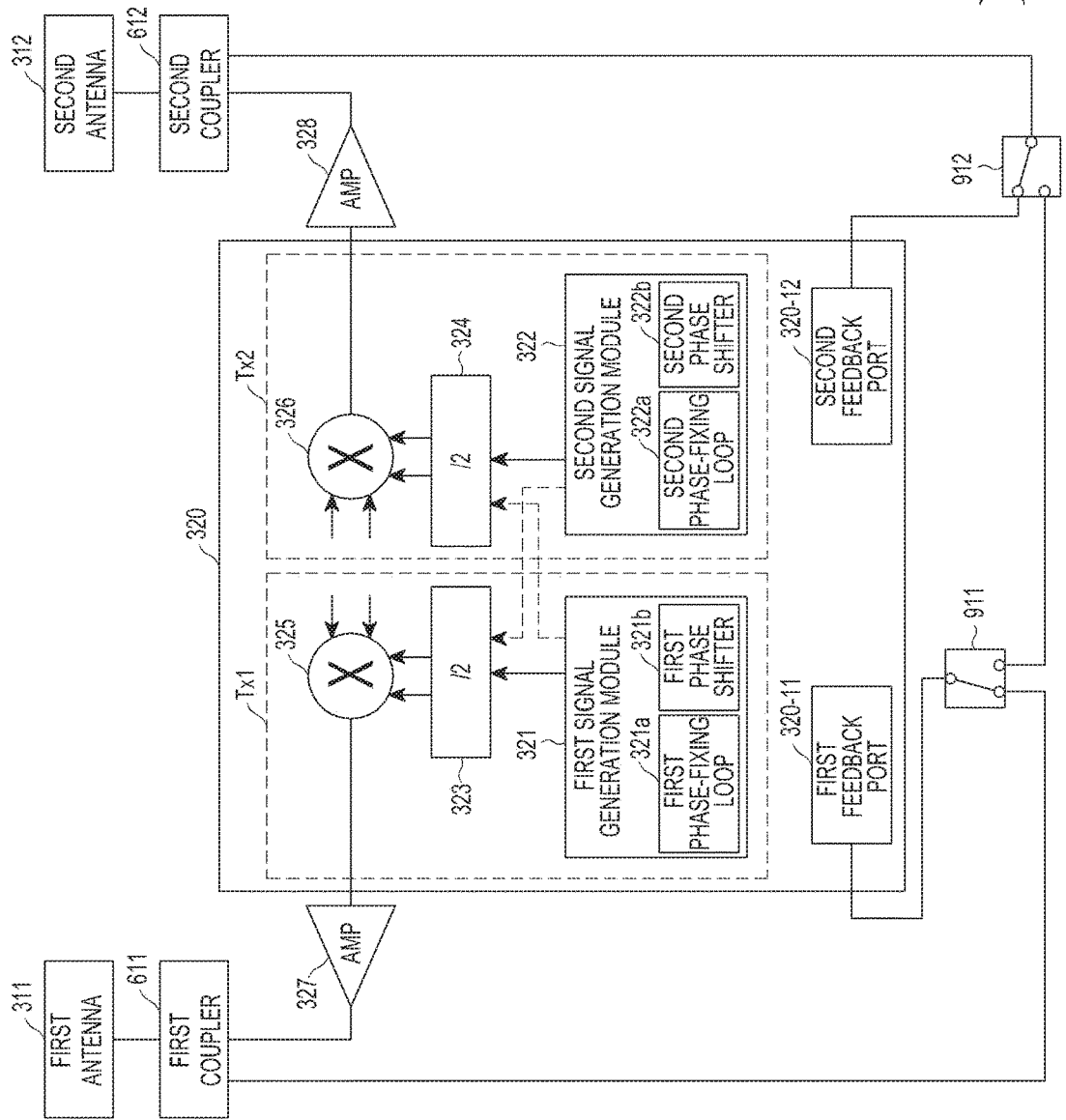
FIG. 9A is a block diagram illustrating the electronic device including the transceiver according to an embodiment of the disclosure.

FIG. 9A is a block diagram illustrating the electronic device including the transceiver according to an embodiment of the disclosure.

In order to compensate for the phase difference between the transmission signals, the transceiver 320 may receive the first feedback transmission signal including the part of the first transmission signal from the first coupler 611. The transceiver 320 may receive the second feedback transmission signal including the part of the second transmission signal from the second coupler 612.

Meanwhile, the electronic device 201 may detect power of the first feedback transmission signal and the second feedback transmission signal through only one of the first feedback port 320-11 and the second feedback port 320-12.

Referring to FIG. 9A, in order to use only one port, the electronic device 201 may include port switches 911 and 912. The port switches 911 and 912 may include the first port switch 911 to deliver both the first feedback transmission signal and the second feedback transmission signal to the first feedback port 320-11. The port switches 911 and 912 may include the second port switch 912 to block the second feedback port 320-12. The first port switch 911 for handling two input signals and one output signal may include a single-pole double-throw (SPDT). The second port switch 912 for handling one input signal and two output signals may also include an SPDT.

It is assumed that the first feedback transmission signal and the second feedback transmission signal are detected by the first feedback port 320-11.

The processor 210 may operate the second port switch 912 in order to divert the path of the second feedback transmission signal, which is originally delivered to the second feedback port 320-12, to the first feedback port 320-11. The second port switch 912 may block the path to the second feedback port 320-12. The second feedback transmission signal may head for the first port switch 911.

Under the above assumption, the processor 210 may control the first port switch 911 to deliver the first feedback transmission signal, which is delivered from the first coupler 611, to the first feedback port 320-11. Further, the processor 210 may control the first port switch 911 such that the second feedback transmission signal heads for the first feedback port 320-11.

The time delay according to the path difference and the phase offset according to the time delay may be further reduced in the case where the first feedback transmission signal and the second feedback transmission signal are detected by the same feedback port rather than the case where the first feedback transmission signal and the second feedback transmission signal are detected by separated feedback ports. Particularly, the use of the one feedback port may be preferred during a calibration process.

Figure 9B:
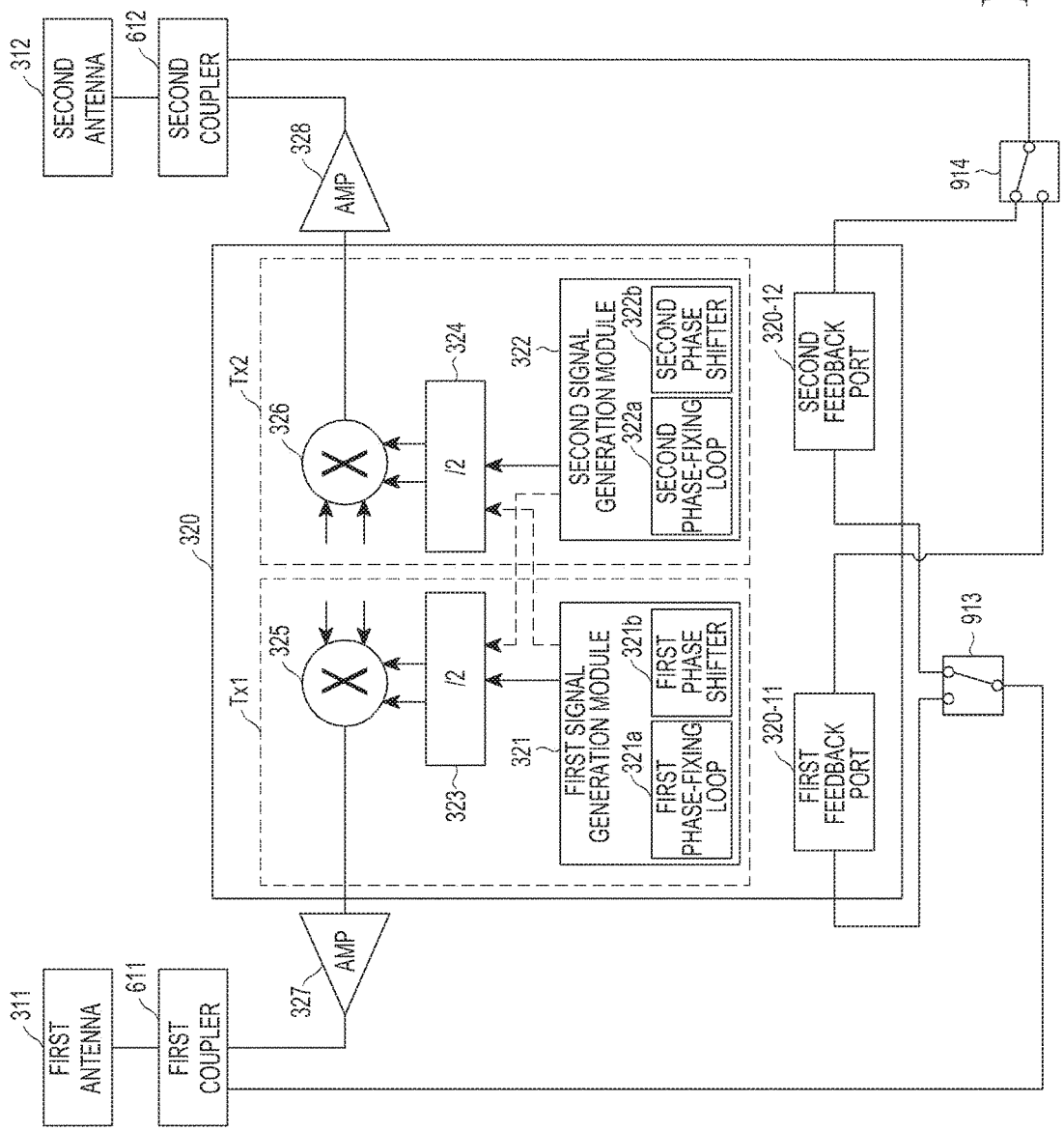
FIG. 9B is a block diagram illustrating the electronic device including the transceiver according to an embodiment of the disclosure.

FIG. 9B is a block diagram illustrating the electronic device including the transceiver according to an embodiment of the disclosure.

The port switches 911 and 912 of FIG. 9A may be variously configured to selectively connect the first coupler 611 to one of the first feedback port 320-11 and the second feedback port 320-12 or the second coupler 612 to one of the first feedback port 320-11 and the second feedback port 320-12.

According to various embodiments, the port switches 913 and 914 may be configured as illustrated in FIG. 9B.

Referring to FIG. 9B, in order to use only one feedback port, the electronic device 201 may include the port switches 913 and 914. The port switches 913 and 914 may include a first port switch 913, for delivering the first feedback transmission signal to the first feedback port 320-11 and the second feedback port 320-12, and a second port switch 914, for delivering the second feedback transmission signal to the first feedback port 320-11 and the second feedback port 320-12. Each of the first port switch 913 and the second port switch 914 may handle one input signal and two output signals and may include an SPDT.

It is assumed that the first feedback transmission signal and the second feedback transmission signal are detected by the second feedback port 320-12.

The processor 210 may control the first port switch 913 to deliver the first feedback transmission signal to the second feedback port 320-12. The first port switch 913 may connect an input terminal to an output terminal connected to the second feedback port 320-12. The first feedback transmission signal delivered from the first coupler 611 may be delivered to the second feedback port 320-12 via the first port switch 913.

The processor 210 may control the second port switch 914 to deliver the second feedback transmission signal to the second feedback port 320-12. The second port switch 914 may connect an input terminal to the output terminal connected to the second feedback port 320-12. The second feedback transmission signal delivered from the second coupler 612 may be delivered to the second feedback port 320-12 via the second port switch 914.

Figure 10:
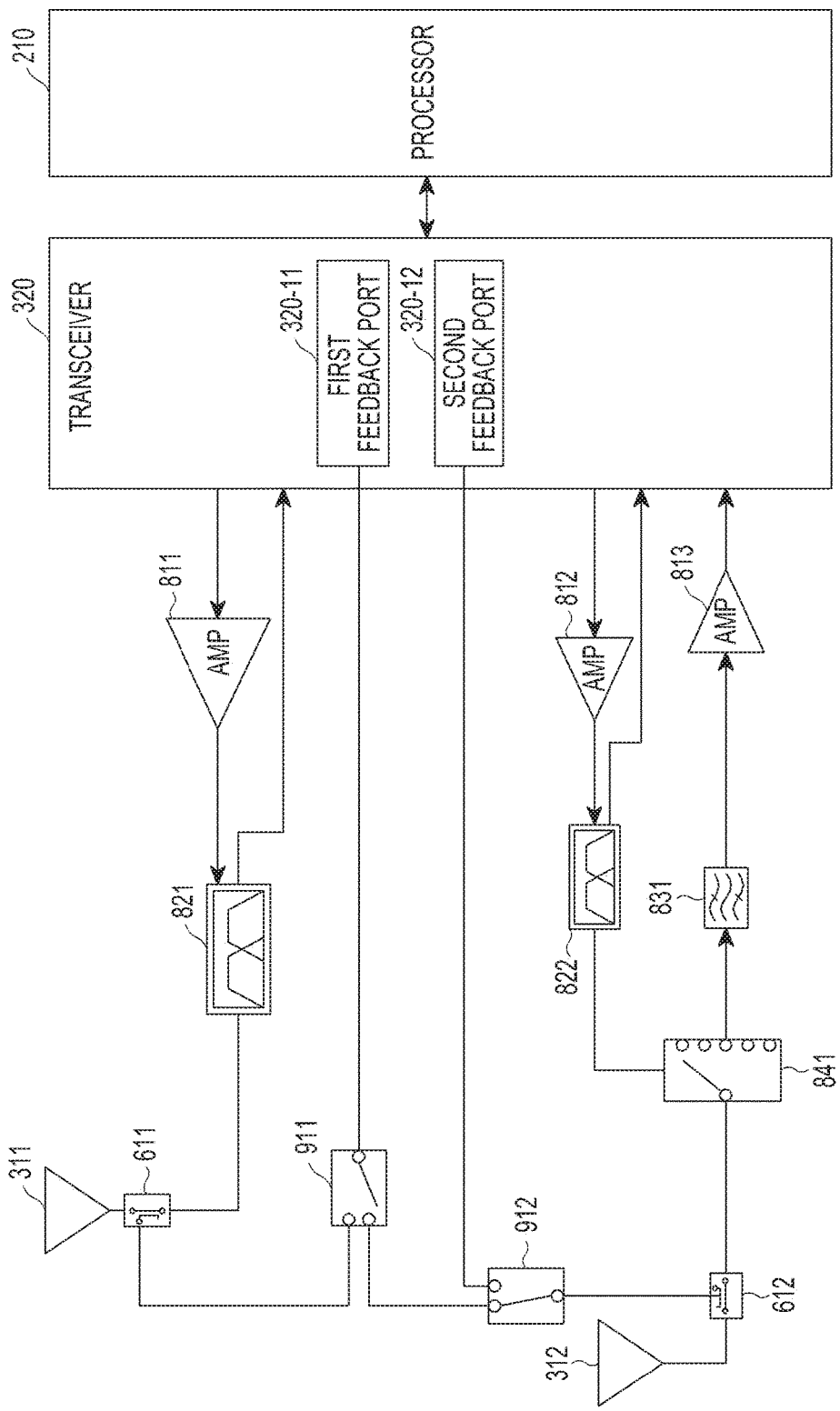
FIG. 10 is a detailed block diagram illustrating the electronic device including the transceiver according to an embodiment of the disclosure.

FIG. 10 is a detailed block diagram illustrating the electronic device including the transceiver according to an embodiment of the disclosure.

Except for the use of the first port switch 911 and the second port switch 912, FIG. 10 is the same as FIG. 8 and may be based on the configuration of the port switches 911 and 912, like in FIG. 9A.

The first port switch 911 may be connected to the first coupler 611 and the second port switch 912 at contact points on one side, and may be connected to the first feedback port 320-11 at a contact point on the other side. Under the control of the processor 210, the first port switch 911 may receive the first feedback transmission signal from the first coupler 611 and the second feedback transmission signal from the second port switch 912. The first port switch 911 may deliver both the first feedback transmission signal and the second feedback transmission signal to the first feedback port 320-11.

The second port switch 912 may be connected to the first port switch 911 and the second feedback port 320-12 at contact points on one side, and may be connected to the second coupler 612 at a contact point on the other side. Under the control of the processor 210, the second port switch 912 may receive the second feedback transmission signal from the second coupler 612. The second port switch 912 may deliver the second feedback transmission signal to the first port switch 911 or the second feedback port 320-12.

Figure 11A:
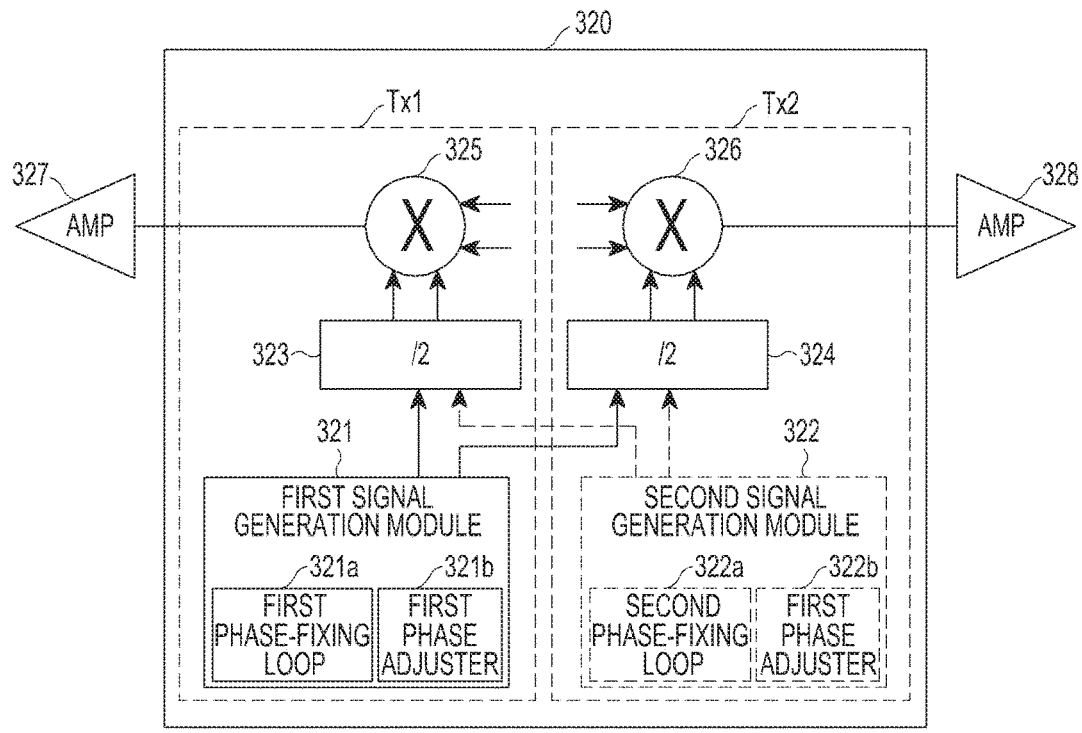
FIGS. 11A and 11B are block diagrams illustrating the electronic device including the transceiver according to an embodiment of the disclosure.
Figure 11B:
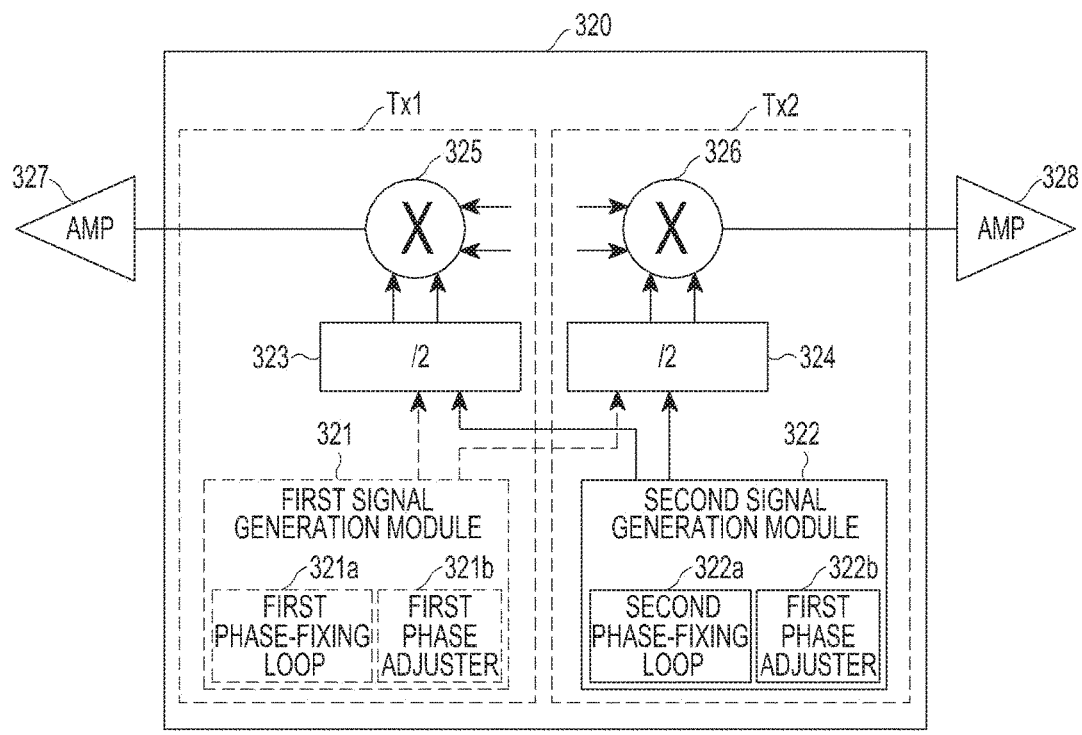

FIGS. 11A and 11B are block diagrams illustrating the electronic device including the transceiver according to an embodiment of the disclosure.

The electronic device 201 may include two signal generation modules 321 and 322. The first signal generation module 321 may include the first phase-fixing loop 321a and the first phase shifter 321b. The second signal generation module 322 may include the second phase-fixing loop 322a and the second phase shifter 322b.

When the first signal generation module 321 generates the first source signal corresponding to the first transmission signal and the second signal generation module 322 generates the second source signal corresponding to the second transmission signal, at least one of the first phase (the phase of the first transmission signal) and the second phase (the phase of the second transmission signal) may be changed by the difference between the physical path of the first transmitting side (Tx1) and the physical path of the second transmitting side (Tx2).

Meanwhile, when the transceiver 320 generates the first source signal and the second source signal through the same source (a single signal generation module), the difference between the physical paths may be reduced, so that the possibility of the generation of the phase difference between the first transmission signal and the second transmission signal may also be reduced.

Referring to FIGS. 11A and 11B, the transceiver 320 of the electronic device 201 may activate only one signal generation module, and may generate both the first source signal and the second source signal.

In FIG. 11A, the processor 210 may active the first signal generation module 321 and deactivate the second signal generation module 322. The first oscillator (not shown) included in the first signal generation module 321 may generate both the first source signal and the second source signal. The first phase-fixing loop 321a may fix both the frequency of the first source signal and the frequency of the second source signal. The first source signal may be delivered to the first frequency divider 323 from the first signal generation module 321. The second source signal may be delivered to the second frequency divider 324 from the first signal generation module 321.

In FIG. 11B, the processor 210 may activate the second signal generation module 322 and deactivate the first signal generation module 321. The second oscillator (not shown) included in the second signal generation module 322 may generate both the first source signal and the second source signal. The second phase-fixing loop 322a may fix both the frequency of the first source signal and the frequency of the second source signal. The first source signal may be delivered to the first frequency divider 323 from the second signal generation module 322. The second source signal may be delivered to the second frequency divider 324 from the second signal generation module 322.

Figure 12:
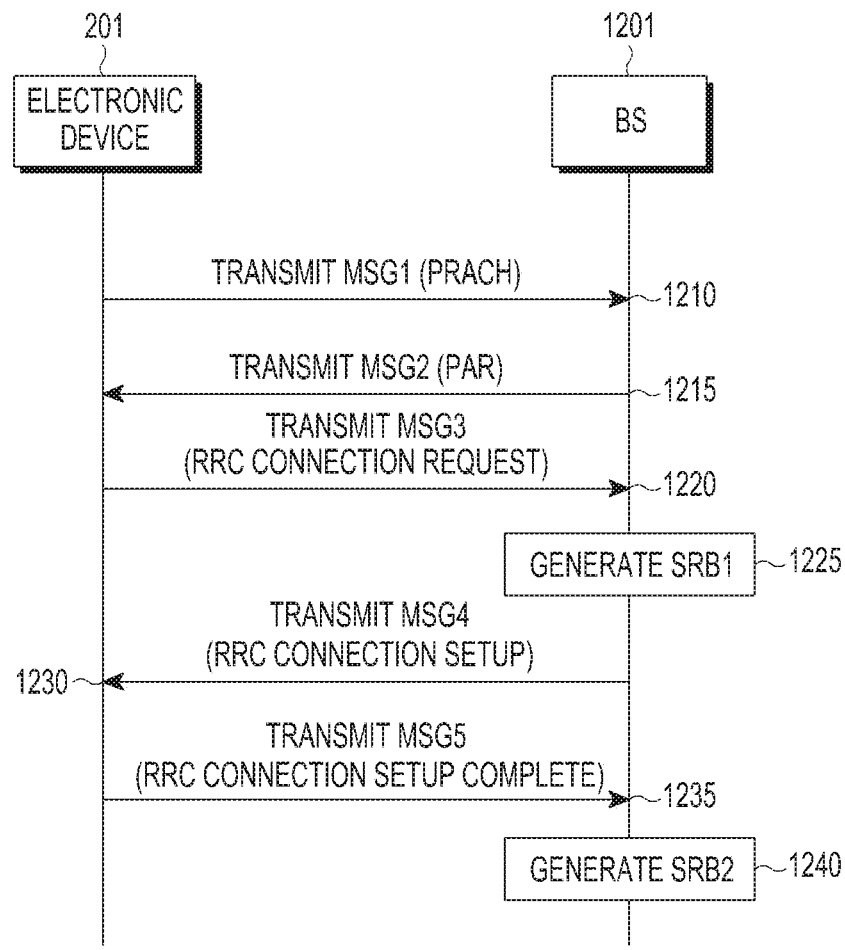
FIG. 12 is a flowchart illustrating a call setup process for compensating for the phase of the transmission signal according to an embodiment of the disclosure.

FIG. 12 is a flowchart illustrating a call setup process for compensating for the phase of the transmission signal according to an embodiment of the disclosure.

Referring to FIG. 12, the compensation for the transmission signal may be implemented in an operation of the call setup between the electronic device 201 and a BS 1201. The operation of the call setup may be described below.

In operation 1210, the electronic device 201 may transmit MSG 1 (message 1) including a random access channel (RACH) to the BS 1201. The reason for transmitting the RACH is to synchronize an uplink, transmit uplink data, and recognize a radio resource control (RRC) state change through RRC configuration.

In operation 1215, through a physical downlink control channel (PDCCH), the BS 1201 may transmit MSG 2 (message 2) including a random access response (RAR) to the electronic device 201.

In operation 1220, the electronic device 201 may transmit MSG 3 (message 3) including an RRC connection request to the BS 1201.

In operation 1225, the BS 1201 may generate signal radio bearer (SRB) 1 while performing RRC connection establishment.

In operation 1230, the BS 1201 may transmit MSG 4 (message 4) including an RRC connection setup to the electronic device 201. The electronic device 201 and the BS 1201 may complete radio resource configuration and connection through dedicated radio resource configuration.

In operation 1235, the electronic device 201 may transmit MSG 5 (message 5) including RRC connection setup complete to the BS 1201.

In operation 1240, the BS 1201 may generate SRB 2 while identifying the RRC connection setup completion. The electronic device 201 and the BS 1201 may generate a non-access stratum (NAS) and transmit and receive data through a data radio bearer (DRB).

Figure 13:
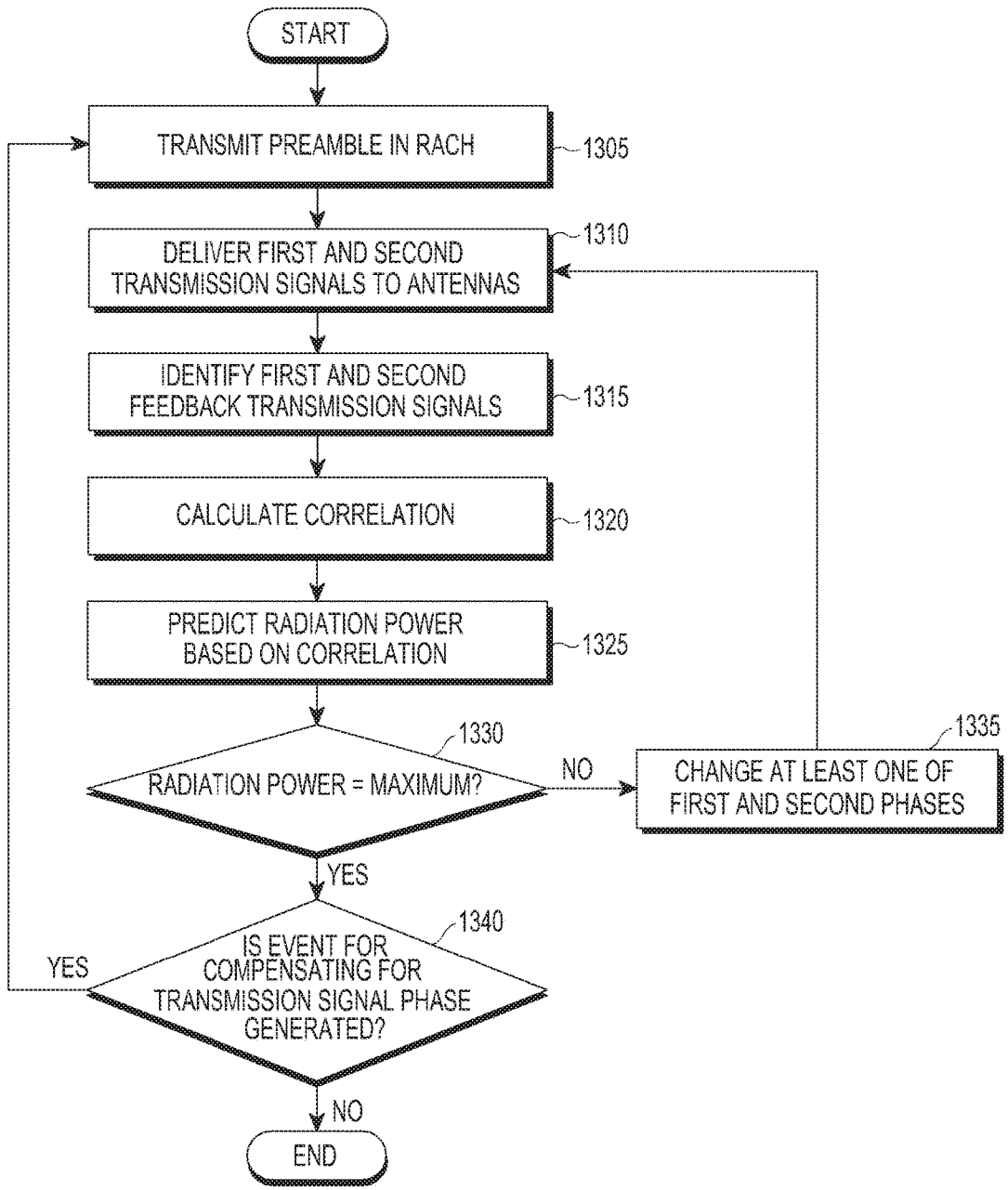
FIG. 13 is a flowchart illustrating a method of compensating for the phase of the transmission signal according to an embodiment of the disclosure.

FIG. 13 is a flowchart illustrating a method of compensating for the phase of the transmission signal according to an embodiment of the disclosure.

In operation 1305, the processor 210 may transmit a preamble during a process of transmitting an RACH to the BS 1201. That is, a call setup process may be initiated. The compensation for the phase of the transmission signal may be implemented during the call setup, and the electronic device 201 may compensate for the phase of the transmission signal in one of operations 1210 to 1240. Accordingly, operation 1305 may include one of operations 1210 to 1240.

After the call connection, resource load due to data transmission/reception cannot be avoided and a side effect due to the resource load may be generated. Accordingly, in order to efficiently use resources, it may be preferable to compensate for the phase of the transmission signal during the call setup process.

In operation 1310, under the control of the processor 210, the transceiver 320 may generate the first source signal and the second source signal. The transceiver 320 may generate the first transmission signal from the first source signal and deliver the generated first transmission signal to the first antenna 311. The transceiver 320 may generate the second transmission signal from the second source signal and deliver the generated second transmission signal to the second antenna 312.

In operation 1315, under the control of the processor 210, the transceiver 320 may receive the first feedback transmission signal from the first coupler 611. Under the control of the processor 210, the transceiver 320 may receive the second feedback transmission signal from the second coupler 612.

In operation 1320, under the control of the processor 210, the transceiver 320 may calculate the correlation between the first feedback transmission signal and the second feedback transmission signal.

In operation 1325, the processor 210 may predict power radiated from the electronic device 201 based on the correlation. The prediction may mean indirectly determining the strength of the radiation power according to the correlation rather than indicating the strength of the radiation power through an accurate value. In order to calculate the correlation, the processor 210 may perform the convolution operation.

In operation 1330, the processor 210 may determine whether the predicted radiation power is the maximum.

When the predicted radiation power is not the maximum, the processor 210 may control the transceiver 320 to change one of the first phase of the first transmission signal and the second phase of the second transmission signal in operation 1335.

For example, under the control of the processor 210, the second phase shifter 322b may change the second phase of the second source signal, and the second signal generation module 322 may generate the second source signal having a new phase changed from the second phase.

The phase shifters 321b and 322b may change the second phase while fixing the first phase. The phase shifters 321b and 322b may change the second phase while fixing the first phase. A unit of change of the phase may be 5° or 10°, and may be randomly determined by the processor 210.

After changing the phase, the transceiver 320 may generate the first and second transmission signals from the first and second source signals and deliver the generated first and second transmission signals to the antennas 311 and 312 in operation 1310. The transceiver 320 may calculate the correlation again in operations 1315 and 1320. The processor 210 may predict the radiation power from the correlation in operation 1325, and may determine whether the radiation power is the maximum in operation 1330. Until the predicted radiation power becomes the maximum, the electronic device 201 may repeatedly change the phase, calculate the correlation of the transmission signal, and predict the radiation power.

In operation 1340, when the radiation power is the maximum, the processor 210 may determine whether an event that makes a request for compensating for the phase of the transmission signal is generated.

When such an event is generated, the processor 210 may initiate the call setup process of operation 1305 and perform the method of compensating the phase of the transmission signal again through operations 1310 to 1335.

When no such event is generated, the processor 210 may radiate the first transmission having the first phase and the second transmission signal having the second phase. The first phase and the second phase may be phases that the first transmission signal and the second transmission signal have from the beginning without any phase change in operation 1310. Further, one of the first phase and the second phase may be changed by the phase shifter 321b or 322b in operation 1330.

The event may include the case where an area in which the electronic device 201 operates is a weak electric field. The weak electric field may include a communication area in which a signal propagation state is bad. The processor 210 may determine whether the electronic device 201 operates in the weak electric field. When the electronic device 201 operates in the weak electric field, the processor 210 may return to operation 1305 and perform the method of compensating for the transmission signal again. However, the disclosure is not limited thereto. The event may include the case where the signal propagation state is good, that is, where an electric field is strong, and the method of compensating for the transmission signal may be performed in the strong electric field.

According to the weak electric field, the event may include the case where the amplifiers 811 and 812 operate in a high-gain mode. In BFTD, when the electronic device 201 is in the weak electric field, the amplifiers 811, 812, 813, and 814 may operate in the high-gain mode. The processor 210 may determine whether the amplifiers 811 and 812 operate in the high-gain mode. When the amplifiers 811 and 812 operate in the high-gain mode, the processor 210 may return to operation 1305 and perform the method of compensating the transmission signal again. However, the disclosure is not limited. According to the strong electric field, the event may include the case of a low-gain mode, and the method of compensating for the transmission signal may be performed with the amplifiers 811 and 812 in the low-gain mode. The low-gain mode of the amplifiers 811 and 812 may mean that the electronic device 201 operates in a strong electric field.

The event may include the case where a change between the weak electric field and the strong electric field is made. The processor 210 may determine whether the area in which the electronic device 201 operates changes from the weak electric field to the strong electric field or from the strong electric field to the weak electric field. When the change is made, the processor 210 may return to operation 1305 and perform the method of compensating for the transmission signal again. When a change between the high-gain mode and the low-gain mode of the amplifiers 811 and 812 is made in response to the change between the weak electric field and the strong electric field, the processor 210 may also return to operation 1305 and perform the method of compensating for the transmission signal again.

The event may include the case where the electronic device 201 performs handover between BSs.

The event may include a period on which the electronic device 201 triggers the performance of the compensation for the transmission signal.

Figure 14:
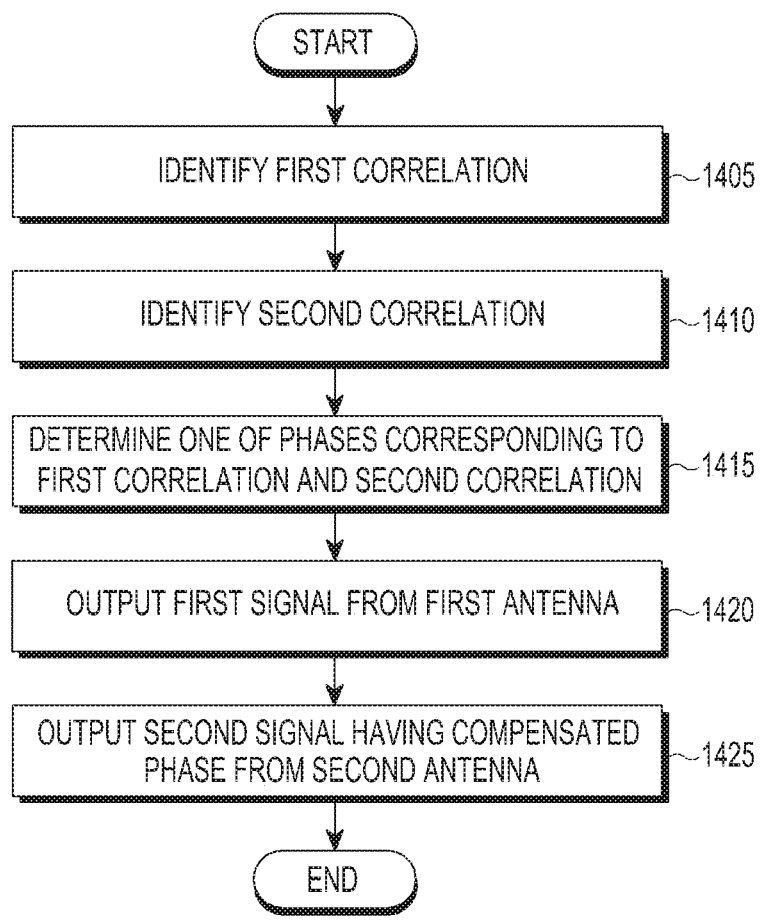
FIG. 14 is a flowchart illustrating the method of compensating for the phase of the transmission signal according to an embodiment of the disclosure.

FIG. 14 is a flowchart illustrating the method of compensating for the phase of the transmission signal according to an embodiment of the disclosure.

In operation 1405, the processor 210 may identify a first correlation between the first transmission signal controlled through the first phase shifter 321b and the second transmission signal controlled through the second phase shifter 322b.

In operation 1410, the processor 210 may identify a second correlation calculated based on the changed phase of at least one of the first transmission signal and the second transmission signal. As in operation 1335, the processor 210 may control the transceiver 320 to change the first phase of the first transmission signal or the second phase of the second transmission signal. As in operation 1320, the transceiver 320 may acquire the second correlation based on the first feedback transmission signal or the second feedback transmission signal having the changed phase. The transceiver 320 may store data on the first correlation and the second correlation in the memory 230 or deliver the data to the processor 210.

In operation 1415, the processor 210 may determine one of the phase value corresponding to the first correlation and the phase value corresponding to the second correlation based on the first correlation and the second correlation.

The phase value corresponding to the first correlation and the phase value corresponding to the second correlation may include both the phase value of the first transmission signal and the phase value of the second transmission signal.

It is assumed that the first phase (the phase of the first transmission signal) is a1 and that the second phase (the phase of the second transmission signal) is a2 in the first correlation. In the second correlation, if the second phase is changed, the changed second phase may be b2. Accordingly, the phase values corresponding to the first correlation may be a1 and a2, and the phase values corresponding to the second correlation may be a1 and b2.

In operation 1420, under the control of the processor 210, the transceiver 320 may output the first transmission signal controlled through the first phase shifter 321b using the first antenna 311.

In operation 1425, under the control of the processor 210, the transceiver 320 may output the second signal in the state where the phase of the second signal is compensated to be the one phase value through the second phase shifter 322b using the second antenna 312.

For example, the transceiver 320 may output the first transmission signal and the second transmission signal having a1 and b2, which are the phase values corresponding to the second correlation. The transceiver 320 may output the first transmission signal having the phase a1 through the first antenna 311 and the second transmission signal having the phase b2 through the second antenna 312.

The method of compensating for the signal phase by the electronic device according to various embodiments may include calculating the first correlation using a convolution operation.

The operation of predicting the radiation power according to various embodiments may include determining the radiation power from the value of the convolution operation.

The operation of changing the radiation power to the predetermined value according to various embodiments may include an operation of calculating a second correlation for the first feedback transmission signal and the second feedback transmission signal having the adjusted phase, an operation of predicting the radiation power based on the second correlation, and an operation of identifying whether the predicted radiation power is the predetermined value.

The operation of identifying the first feedback transmission signal and the second feedback transmission signal according to various embodiments may include an operation of identifying the first feedback transmission signal and the second feedback transmission signal individually using a plurality of feedback ports.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the disclosure may include at least one of an ASIC chip, a FPGA, and a programmable-logic device for performing operations which has been known or are to be developed hereinafter.

According to various embodiments, at least some of the devices (for example, modules or functions thereof) or the method (for example, operations) according to the disclosure may be implemented by a command stored in a computer-readable storage medium in a programming module form. When the command is executed by one or more processors (for example, the processor 120), the one or more processors may execute a function corresponding to the command. The computer-readable storage medium may, for example, be the memory 130.

The computer readable recoding medium may include a hard disk, a floppy disk, magnetic media (e.g., a magnetic tape), optical media (e.g., a CD-ROM and a digital versatile disc (DVD)), magneto-optical media (e.g., a floptical disk), a hardware device (e.g., a ROM, a RAM, a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the disclosure, and vice versa.

According to various embodiments, a storage medium storing instructions is provided. The instructions may be configured to cause at least one processor to perform at least one operation when executed by the at least one processor. In the method of compensating for the signal phase by the electronic device, the at least one operation may include an operation of identifying a first feedback transmission signal including a part of a first transmission signal having a first phase, which is transmitted through a first antenna, an operation of identifying a second feedback transmission signal including a part of a second transmission signal having a second phase, which is transmitted through a second antenna, an operation of calculating a first correlation for the first feedback transmission signal and the second feedback transmission signal, an operation of predicting radiation power radiated from the electronic device based on the first correlation; an operation of adjusting at least one of the first phase and the second phase, and an operation of changing the predicted radiation power to a predetermined value based on the adjustment of the at least one phase.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
    a first antenna configured to transmit a first transmission signal having a first phase;
    a second antenna configured to transmit a second transmission signal having a second phase;
    a transceiver electrically connected to the first antenna and the second antenna; and
    a processor,
    wherein the transceiver is configured to:
        identify a first feedback transmission signal including a part of the first transmission signal and a second feedback transmission signal including a part of the second transmission signal, and
        calculate a correlation for the first feedback transmission signal and the second feedback transmission signal, and
    wherein the processor is configured to:
        predict radiation power radiated from the electronic device based on at least a part of the correlation,
        control the transceiver to adjust at least one of the first phase or the second phase, and
        change the predicted radiation power to a predetermined value based on an operation for the adjustment.

2. The electronic device of claim 1,
    wherein the transceiver comprises a first phase shifter and a second phase shifter, and
    wherein the processor is further configured to control a phase of the first transmission signal through the first phase shifter and a phase of the second transmission signal through the second phase shifter.

3. The electronic device of claim 2, wherein the processor is further configured to control the phase of the first transmission signal and the phase of the second transmission signal through one of the first phase shifter or the second phase shifter.

4. The electronic device of claim 1,
    wherein the transceiver comprises a first feedback port and a second feedback port, and
    wherein the transceiver is further configured to acquire the first feedback transmission signal through the first feedback port and the second feedback transmission signal through the second feedback port.

5. The electronic device of claim 4, further comprising:
    a first coupler configured to deliver the first feedback transmission signal to the first feedback port; and
    a second coupler configured to deliver the second feedback transmission signal to the second feedback port.

6. The electronic device of claim 5, further comprising:
    a first port switch configured to selectively connect the first coupler to one of the first feedback port and the second feedback port; and
    a second port switch configured to selectively connect the second coupler to one of the first feedback port and the second feedback port.

7. The electronic device of claim 6, wherein the processor is further configured to acquire the second feedback transmission signal through the first feedback port using the first port switch.

8. The electronic device of claim 6, wherein the processor is further configured to acquire the first feedback transmission signal through the second feedback port using the second port switch.

9. The electronic device of claim 1, wherein the processor is further configured to change at least one of the first phase or the second phase during a call setup.

10. The electronic device of claim 1, wherein the processor is further configured to:
    determine whether the electronic device operates in a weak electric field or a strong electric field, and
    change at least one of the first phase or the second phase when the electronic device operates in the weak electric field.

11. A method of compensating for a signal phase by an electronic device, the method comprising:

identifying a first feedback transmission signal including a part of a first transmission signal having a first phase, which is transmitted through a first antenna;

identifying a second feedback transmission signal including a part of a second transmission signal having a second phase, which is transmitted through a second antenna;

calculating a first correlation for the first feedback transmission signal and the second feedback transmission signal;

predicting radiation power radiated from the electronic device based on the first correlation;

adjusting at least one of the first phase or the second phase; and changing the predicted radiation power to a predetermined value based on the adjusting of the at least one phase.

12. The method of claim 11, wherein the calculating of the first correlation comprises calculating the first correlation using a convolution operation.

13. The method of claim 12, wherein the predicting of the radiation power comprises determining the radiation power from a value of the convolution operation.

14. The method of claim 11, wherein the changing of the radiation power to the predetermined value comprises:

calculating a second correlation for the first feedback transmission signal and the second feedback transmission signal having the adjusted phase;

predicting the radiation power based on the second correlation; and identifying whether the predicted radiation power is the predetermined value.

15. The method of claim 11, wherein the identifying of the first feedback transmission signal and the second feedback transmission signal comprises identifying the first feedback transmission signal and the second feedback transmission signal individually using a plurality of feedback ports.

16. The method of claim 15, wherein the identifying of the first feedback transmission signal and the second feedback transmission signal comprises identifying the first feedback transmission signal and the second feedback transmission signal together using a single feedback port.

\* \* \* \* \*